US012174565B2

(12) United States Patent
Matsumoto et al.

(10) Patent No.: US 12,174,565 B2
(45) Date of Patent: Dec. 24, 2024

(54) HEATING DEVICE, FIXING DEVICE, AND IMAGE FORMING APPARATUS WITH A SINGLE SHEET SENSOR

(71) Applicants: Yuma Matsumoto, Kanagawa (JP); Keitaro Shoji, Kanagawa (JP); Yasunori Ishigaya, Kanagawa (JP); Yuusuke Furuichi, Kanagawa (JP)

(72) Inventors: Yuma Matsumoto, Kanagawa (JP); Keitaro Shoji, Kanagawa (JP); Yasunori Ishigaya, Kanagawa (JP); Yuusuke Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/319,594

(22) Filed: May 18, 2023

(65) Prior Publication Data

US 2023/0384719 A1 Nov. 30, 2023

(30) Foreign Application Priority Data

May 24, 2022 (JP) ................................ 2022-084525

(51) Int. Cl.
*G03G 15/20* (2006.01)

(52) U.S. Cl.
CPC ..... *G03G 15/2039* (2013.01); *G03G 15/2042* (2013.01); *G03G 15/2053* (2013.01); *G03G 15/2064* (2013.01); *G03G 2215/2035* (2013.01)

(58) Field of Classification Search
CPC ........... G03G 15/2039; G03G 15/2042; G03G 15/2046; G03G 15/6558;
(Continued)

(56) References Cited

U.S. PATENT DOCUMENTS 6,185,383 B1 * 2/2001 Kanari ............... G03G 15/2042 399/334
2001/0017992 A1 * 8/2001 Hayashi ............... G03G 15/205 399/68

(Continued)

FOREIGN PATENT DOCUMENTS

JP 2010-026449 2/2010
JP 2019-056814 4/2019
JP 2020-052345 4/2020

OTHER PUBLICATIONS

U.S. Appl. No. 18/060,566, filed Nov. 30, 2022, Yuusuke Furuichi, et al.

*Primary Examiner* — Robert B Beatty
(74) *Attorney, Agent, or Firm* — Harness, Dickey & Pierce, P.L.C.

(57) ABSTRACT

A heating device includes: a pair of rotators to form a nip; a heating source having a heat generation area to heat at least one rotator; temperature sensors to detect a temperature of the heating source, a member in contact with the heating source, or one rotator; and a sheet sensor to detect a sheet passing through the nip. The temperature sensors include: a first temperature sensor closer to one end than a center of the heat generation area in the longitudinal direction; and a second temperature sensor closer to the center than the first temperature sensor is. The second temperature sensor is at a position shifted from the center of the heat generation area toward the first temperature sensor. The sheet sensor is on a side opposite a side on which the first temperature sensor is disposed with reference to the center of the heat generation area.

20 Claims, 21 Drawing Sheets

(58) Field of Classification Search
CPC .......... G03G 2215/00611; G03G 2215/00628; G03G 2215/00721; G03G 15/2035; G03G 15/2064; G03G 15/5029; G03G 2215/00734; G03G 2215/00949; G03G 2215/2045; H05B 1/0241; H05B 3/0066
USPC ............................ 399/69, 334, 389; 219/216
See application file for complete search history.

(56) References Cited

U.S. PATENT DOCUMENTS

| | | | | |
|---|---|---|---|---|
| 2002/0018664 | A1* | 2/2002 | Iwasaki | G03G 15/2039 399/69 |
| 2006/0062610 | A1* | 3/2006 | Ito | G03G 15/2042 399/328 |
| 2007/0071475 | A1* | 3/2007 | Blair | G03G 15/2046 399/68 |
| 2009/0245835 | A1* | 10/2009 | Campbell | G03G 15/2042 399/68 |
| 2015/0316879 | A1* | 11/2015 | Koyama | G03G 15/2017 399/69 |
| 2018/0284667 | A1* | 10/2018 | Lesaki | G03G 15/2039 |
| 2020/0192263 | A1* | 6/2020 | Doda | G03G 21/10 |
| 2021/0072683 | A1* | 3/2021 | Yoshida | G03G 15/2042 |
| 2021/0278790 | A1 | 9/2021 | Furuichi et al. | |
| 2022/0179338 | A1* | 6/2022 | Seshita | G03G 15/2053 |
| 2022/0283530 | A1 | 9/2022 | Adachi et al. | |
| 2022/0291610 | A1 | 9/2022 | Seki et al. | |
| 2022/0299919 | A1 | 9/2022 | Inoue et al. | |
| 2022/0299920 | A1 | 9/2022 | Shimada et al. | |
| 2022/0308511 | A1 | 9/2022 | Someya et al. | |
| 2022/0357697 | A1 | 11/2022 | Furuichi | |
| 2022/0382191 | A1 | 12/2022 | Furuichi et al. | |
| 2022/0382192 | A1 | 12/2022 | Inoue et al. | |
| 2022/0390894 | A1 | 12/2022 | Saito et al. | |
| 2023/0004108 | A1 | 1/2023 | Furuichi et al. | |
| 2023/0010218 | A1 | 1/2023 | Shoji et al. | |
| 2023/0063779 | A1 | 3/2023 | Shimada et al. | |
| 2023/0081075 | A1 | 3/2023 | Someya et al. | |
| 2023/0110956 | A1 | 4/2023 | Furuichi | |
| 2023/0266699 | A1* | 8/2023 | Shoji | H05B 1/0241 399/69 |
| 2023/0288850 | A1* | 9/2023 | Shoji | G03G 15/2028 |
| 2023/0367252 | A1* | 11/2023 | Matsumoto | G03G 15/6529 |

* cited by examiner

HEATING DEVICE, FIXING DEVICE, AND IMAGE FORMING APPARATUS WITH A SINGLE SHEET SENSOR

CROSS-REFERENCE TO RELATED APPLICATION

This patent application is based on and claims priority pursuant to 35 U.S.C. § 119(a) to Japanese Patent Application No. 2022-084525, filed on May 24, 2022, in the Japan Patent Office, the entire disclosure of which is hereby incorporated by reference herein.

BACKGROUND

Technical Field

Embodiments of the present disclosure relate to a heating device, a fixing device, and an image forming apparatus.

Related Art

As an example of a heating device mounted in an image forming apparatus such as a copier or a printer, a fixing device is known that heats a sheet bearing an unfixed image to fix the unfixed image to the sheet.

In general, a fixing device includes a pair of rotators that come into contact with each other to form a nip through which a sheet passes, and a heating source that heats at least one of the rotators. In a state where one or both of the rotators are heated to a predetermined temperature by the heating source, if the sheet bearing un unfixed image is conveyed to the nip between the pair of rotators, the sheet is heated and pressurized at the nip, so that the unfixed image is fixed to the sheet.

In such a case, in a region where the sheet is in contact with the rotators, heat of the rotators is consumed by passage of the sheet. On the other hand, in a region where the sheet does not pass, heat is hardly consumed by the sheet. In particular, if a plurality of sheets is continuously conveyed to the fixing device, heat is less likely to be consumed in the region where the sheets do not pass, so that the rotators may accumulate heat and the temperature of the rotators may excessively rise. For this reason, in conventional fixing devices, the temperature detection member detects a temperature rise in the non-passing area where the sheet does not pass, and the conveyance speed of the sheet is decreased before the temperature of the rotators excessively rises, thereby preventing the temperature rise of the rotators.

SUMMARY

According to an embodiment of the present disclosure, a heating device includes a pair of rotators, a heating source, a plurality of temperature sensors, and a sheet sensor. The pair of rotators contact each other to form a nip through which a sheet passes. The heating source has a heat generation area including a resistive heat generator to heat at least one of the pair of rotators. The plurality of temperature sensors detect a temperature of the heating source, a member in contact with the heating source, or one of the pair of rotators. The sheet sensor detects the sheet passing through the nip. The plurality of temperature sensors include a first temperature sensor and a second temperature sensor. The first temperature sensor is at a position closer to one end of the heat generation area in a longitudinal direction of the heating source than a center of the heat generation area in the longitudinal direction of the heating source. The second temperature sensor is at a position closer to the center of the heat generation area in the longitudinal direction of the heating source than the first temperature sensor is. The second temperature sensor is at a position shifted from the center of the heat generation area toward the first temperature sensor in the longitudinal direction of the heating source. The sheet sensor is on a side opposite a side on which the first temperature sensor is disposed with reference to the center of the heat generation area in the longitudinal direction of the heating source.

According to another embodiment of the present disclosure, a fixing device includes the heating device to fix an unfixed image on the sheet.

According to still another embodiment of the present disclosure, an image forming apparatus includes the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
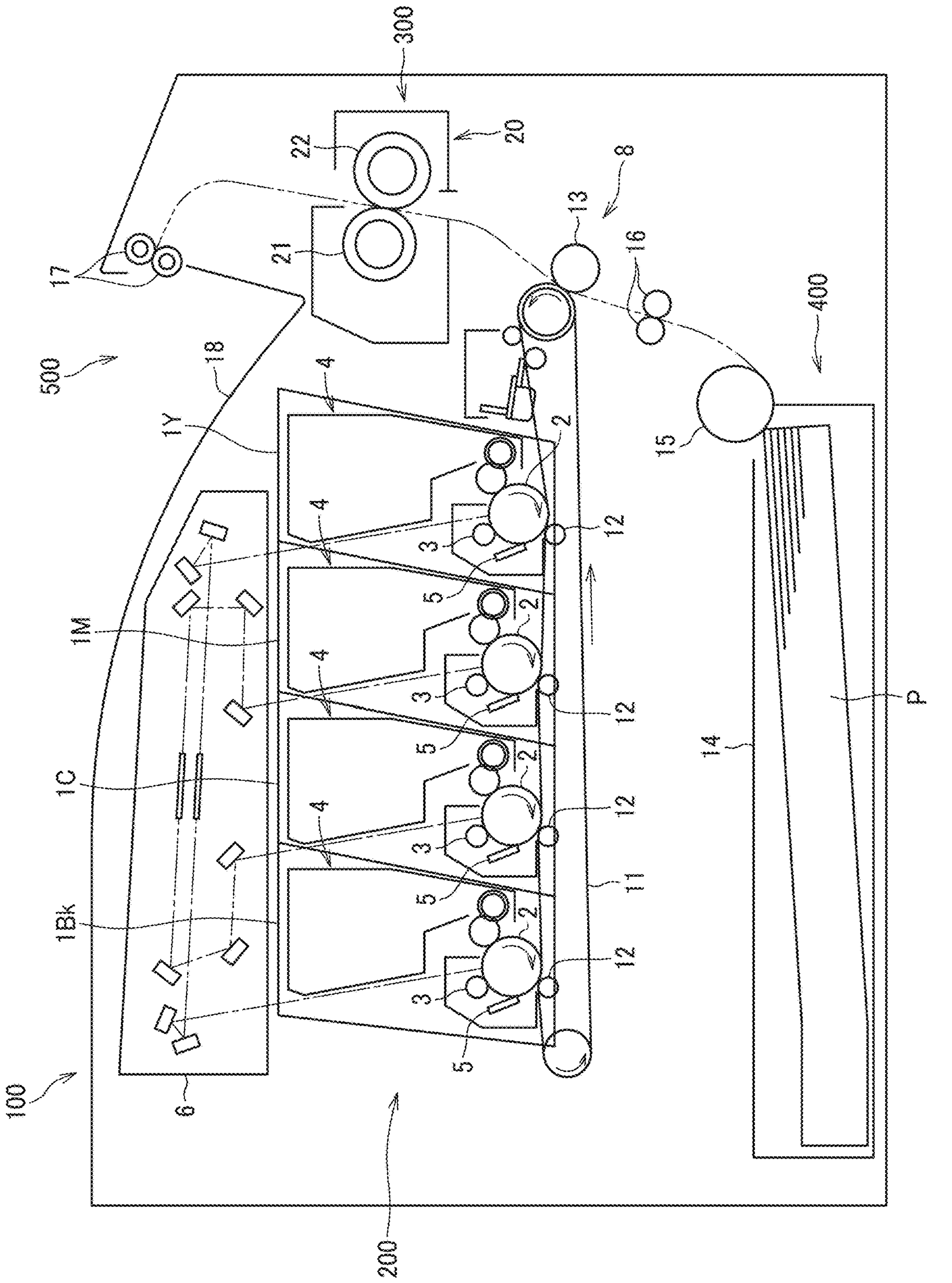
FIG. 1 is a schematic configuration diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure will be described with reference to the accompanying drawings. In the drawings for describing embodiments of the present disclosure, constituent elements such as members and components having identical or similar functions or shapes are given identical reference numerals as far as they are distinguishable, and redundant descriptions thereof are omitted.

FIG. 1 is a schematic configuration diagram of an image forming apparatus according to an embodiment of the present disclosure. In the following description, the "image forming apparatus" includes printer, copier, facsimile machine, printing machine, or multifunction peripheral having a combination of at least two of printer, copier, facsimile machine, and printing machine. The term "image formation"

in the following description means not only forming an image having a meaning such as texts and graphics but also forming an image having no meaning such as patterns. Initially, with reference to FIG. 1, a description is given of a general arrangement and operation of the image forming apparatus according to the present embodiment.

As illustrated in FIG. 1, the image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming section 200, and a recording medium ejection section 500 to eject the recording medium to an outside of the image forming apparatus 100.

The image forming section 200 includes four process units 1Y, 1M, 1C, and 1Bk as image formation units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of full-color images. Specifically, each of the process units 1Y, 1M, 1C, and 1Bk includes a photoconductor 2 serving as an image bearer bearing the image on the surface thereof, a charger 3 to charge the surface of the photoconductor 2, a developing device 4 to supply the toner as the developer to the surface of the photoconductor 2 to form a toner image, and a cleaner 5 to clean the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside a loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 300 includes a fixing device 20. The fixing device 20 includes a fixing belt 21 that is an endless belt and a pressure roller 22 as an opposed rotator opposite to the fixing belt 21. The fixing belt 21 and the pressure roller 22 are in contact with each other at their outer peripheral surfaces to form a nip (i.e., a fixing nip).

The recording medium feeder 400 is provided with a sheet feeding cassette 14 as a sheet storage that stores a sheet P as a recording medium, and a sheet feeding roller 15 that feeds the sheet P from the sheet feeding cassette 14. The “recording medium” is described as a “sheet” in the following embodiments but is not limited to the sheet. Examples of the “recording medium” include not only the sheet of paper but also an overhead projector (OHP) transparency sheet, a fabric, a metallic sheet, a plastic film, and a prepreg sheet including carbon fibers previously impregnated with resin. Examples of the “sheet” include thick paper, a postcard, an envelope, thin paper, coated paper (e.g., coat paper and art paper), and tracing paper, in addition to plain paper.

The recording medium ejection section 500 includes an output roller pair 17 to eject the sheet P to the outside of the image forming apparatus 100 and an output tray 18 to place the sheet P ejected by the output roller pair 17.

Next, printing operations of the image forming apparatus 100 according to the present embodiment are described with reference to FIG. 1.

When the image forming apparatus 100 starts the printing operations, the photoconductors 2 of the process units 1Y, 1M, 1C, and 1Bk and the intermediate transfer belt 11 of the transfer device 8 start rotating. The sheet feeding roller 15 starts rotating to feed the sheet P from the sheet feeding cassette 14. The sheet P fed is brought into contact with a timing roller pair 16 and temporarily stopped until the image to be transferred to the sheet P is formed.

Firstly, in each of the process units 1Y, 1M, 1C, and 1Bk, the charger 3 uniformly charges the surface of the photoconductor 2 to a high potential. Next, the exposure device 6 exposes the surface (i.e., the charged surface) of each photoconductor 2 based on image data of a document read by a document reading device or print image data sent from a terminal that sends a print instruction. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming the toner image thereon. When the toner images formed on the photoconductors 2 reach the primary transfer nips defined by the primary transfer rollers 12 with the rotation of the photoconductors 2, the toner images formed on the photoconductors 2 are transferred onto the intermediate transfer belt 11 successively such that the toner images are superimposed on the intermediate transfer belt 11. Thus, the full color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred from the photoconductor 2 onto the intermediate transfer belt 11, the cleaner 5 removes residual toner that are remained on the photoconductor 2 from the surface of the photoconductor 2.

In accordance with rotation of the intermediate transfer belt 11, the toner image transferred onto the intermediate transfer belt 11 is conveyed to the secondary transfer nip (the position of the secondary transfer roller 13) and is transferred onto the sheet P conveyed by the timing roller pair 16. The sheet P bearing the full color toner image is conveyed to the fixing device 20 in which the fixing belt 21 and the pressure roller 22 fix the full color toner image onto the sheet P under heat and pressure. Further, the sheet P is conveyed to the recording medium ejection section 500 and ejected to the output tray 18 by the output roller pair 17. Thus, a series of printing operations is completed.

Figure 2:
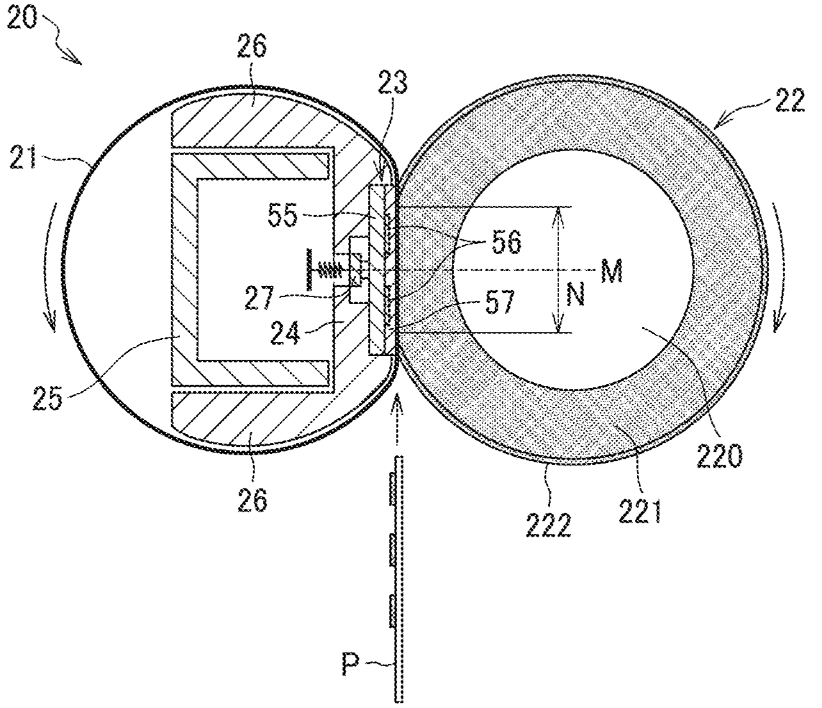
FIG. 2 is a schematic configuration diagram of a fixing device incorporated in the image forming apparatus of FIG. 1, according to an embodiment of the present disclosure.

Next, with reference to FIG. 2, a description is given of the configuration of the fixing device 20 according to the present embodiment.

As illustrated in FIG. 2, the fixing device 20 according to the present embodiment includes a heater 23, a heater holder 24, a stay 25, a guide 26, and a temperature sensor 27 in addition to the fixing belt 21 and the pressure roller 22.

The fixing belt 21 is a rotator as a first rotator or a fixing rotator to be in contact with a surface of the sheet P bearing an unfixed toner image and fix the unfixed toner (unfixed image) onto the sheet P. The fixing belt 21 is a flexible endless belt. A loop diameter of the fixing belt 21 is in a range of, for example, 15 mm to 120 mm. In the present embodiment, the fixing belt 21 has a loop diameter of 25 mm.

Figure 3:
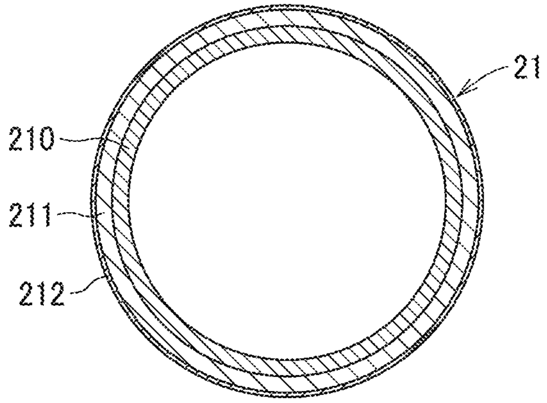
FIG. 3 is a cross-sectional view of a fixing belt according to an embodiment of the present disclosure.

As illustrated in FIG. 3, the fixing belt 21 includes a base 210, an elastic layer 211, and a release layer 212 successively layered from the inner circumferential surface to the outer circumferential surface and has a total thickness set not greater than 1 mm. The base 210 has a thickness in a range of from 30 μm to 50 μm and is made of metal, such as nickel or stainless steel, or resin such as polyimide. The elastic layer 211 has a thickness of 100 μm to 300 μm and is made of rubber such as silicone rubber, silicone rubber foam, or fluoro-rubber. The elastic layer 211 of the fixing belt 21 absorbs slight surface asperities of the fixing belt 21 at the fixing nip, facilitating even heat conduction from the fixing belt 21 to the color toner image T on the sheet P. The release layer 212 of the fixing belt 21 has a thickness in a range of from 10 μm to 50 μm and is made of material such as tetrafluoroethylene-perfluoroalkylvinylether copolymer (PFA), polytetrafluoroethylene (PTFE), polyimide, polyether imide, and polyether sulfone (PES). The release layer 212 of the fixing belt 21 facilitates separation of toner T contained in the toner image formed on the sheet P from the fixing belt 21.

As illustrated in FIG. 2, the pressure roller 22 is a rotator as a second rotator or the opposed rotator and is disposed to face the outer circumferential surface of the fixing belt 21. The pressure roller 22 comes into contact with the fixing belt 21 on the heater 23 to form a fixing nip N between the pressure roller 22 and the fixing belt 21.

The pressure roller 22 has, for example, an outer diameter of 25 mm and includes a hollow iron core 220, an elastic layer 221 on the outer circumferential surface of the core 220, and a release layer 222 on the outer circumferential surface of the elastic layer 221. The elastic layer 221 has, for example, a thickness of 3.5 mm and is made of silicone rubber or the like. The release layer 222 has, for example, a thickness of about 40 μm and is made of fluororesin or the like.

The heater 23 is a heat source to heat the inner circumferential surface of the fixing belt 21. The heater 23 is a planar heater extending in a longitudinal direction of the fixing belt 21 (i.e., a width direction of the sheet intersecting a sheet conveyance direction). The heater 23 is disposed so as to be in contact with the inner circumferential surface of the fixing belt 21. The heater 23 according to the present embodiment includes a base 55, resistive heat generators 56 disposed on the base 55, and an insulation layer 57 covering the resistive heat generators 56.

Although the resistive heat generators 56 are disposed on the front side of the base 55 facing the pressure roller 22 (in other words, the front side facing the fixing nip N) in the present embodiment as illustrated in FIG. 2, alternatively, the resistive heat generator 56 may be disposed on the back side of the base 55. In this case, since the heat of the resistive heat generators 56 is transmitted to the fixing belt 21 through the base 55, it is preferable that the base 55 be made of a material with high thermal conductivity such as aluminum nitride.

The heater holder 24 is a heat source holder disposed inside the loop of the fixing belt 21 to hold the heater 23. Since the heater holder 24 is subject to temperature increase by heat from the heater 23, the heater holder 24 is preferably made of a heat-resistant material. For example, the heater holder 24 made of a heat-resistant resin having low heat conductivity, such as a liquid crystal polymer (LCP) or polyether ether ketone (PEEK), has a heat-resistant property and reduces heat transfer from the heater 23 to the heater holder 24. As a result, the heater 23 can efficiently heats the fixing belt 21.

The stay 25 supports the heater holder 24. The stay 25 supports a stay side face of the heater holder 24 extending in the longitudinal direction of the fixing belt 21. The stay side face is opposite a nip side face of the heater holder 24. The nip side face faces the pressure roller 22. Accordingly, the stay 25 prevents the heater holder 24 from being bended by a pressing force of the pressure roller 22. As a result, the fixing nip N having a uniform width is formed between the fixing belt 21 and the pressure roller 22. The stay 25 is preferably made of an iron-based metal such as steel use stainless (SUS) or steel electrolytic cold commercial (SECC) that is electrogalvanized sheet steel to ensure rigidity.

The guide 26 guides the inner circumferential surface of the fixing belt 21. The guide 26 has an arc-shaped cross-section following the inner peripheral surface of the fixing belt 21, and is disposed upstream and downstream of the heater 23 in the rotation direction of the fixing belt 21 (arrow direction in FIG. 2). In the present embodiment, the guide 26 is formed integrally with the heater holder 24 but may be formed separately.

The temperature sensor 27 is a temperature detector that detects the temperature of the heater 23. The temperature sensor 27 may be a known temperature sensor such as a thermopile, a thermostat, a thermistor, or a non-contact (NC) sensor. The temperature sensor 27 in the present embodiment is a contact type temperature sensor that is in contact with a stay side face of the heater 23 to detect the temperature of the heater 23. The stay side face of the heater 23 is opposite to a side face of the heater 23 facing pressure roller 22. The temperature sensor 27 is not limited to the contact type temperature sensor. The temperature sensor 27 may be a non-contact type temperature sensor that is disposed not to be in contact with the heater 23 and detects temperature in the vicinity of the heater 23.

The fixing device 20 configured as described above operates as follows.

As illustrated in FIG. 2, as the driver drives and rotates the pressure roller 22, a driving force of the driver is transmitted from the pressure roller 22 to the fixing belt 21, thus rotating the fixing belt 21 in accordance with rotation of the pressure roller 22 by friction between the fixing belt 21 and the pressure roller 22. The heater 23 heats the fixing belt 21. The temperature sensor 27 detects the temperature of the heater 23 at this time, and a controller controls an amount of heat generated by the heater 23 based on the detected temperature. Thus, the controller maintains the temperature of the fixing belt 21 to be a fixing temperature in which the fixing belt 21 can fix the unfixed toner image onto the sheet. The sheet P bearing the unfixed toner image is conveyed to the fixing nip N between the fixing belt 21 and the pressure roller 22, and the fixing belt 21 and the pressure roller 22 apply heat and pressure to the sheet P to fix the unfixed toner image onto the sheet P.

Figure 4:
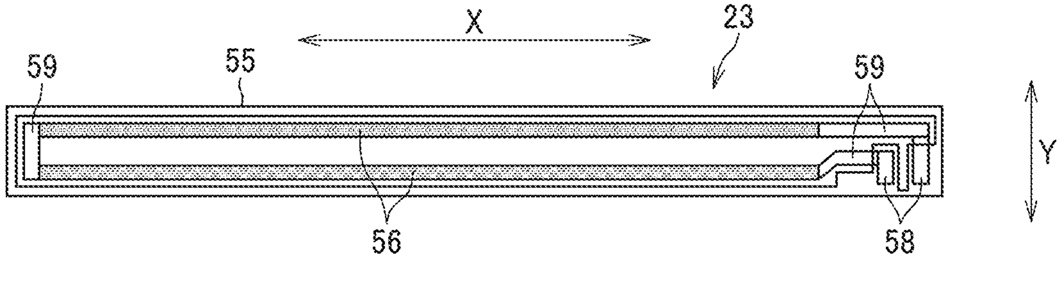
FIG. 4 is a plan view of a heater according to an embodiment of the present disclosure.

FIG. 4 is a plan view of the heater according to the present embodiment.

As illustrated in FIG. 4, the heater 23 according to the present embodiment includes a base 55 having a planar shape extending in a direction indicated by arrow X in FIG. 4. The base 55 is disposed so that a longitudinal direction X of the base 55 is in parallel with the longitudinal direction of the fixing belt 21 or an axial direction of the pressure roller 22. On the surface of the base 55, two resistive heat generators 56 extend in the longitudinal direction X of the base 55 and are arranged side by side in a short-side direction Y of the base 55. The "lateral direction" means a direction orthogonal to the longitudinal direction X along the surface of the base 55 on which the resistive heat generators 56 are provided, and is the same direction as the sheet conveyance direction in which the sheet is conveyed.

As illustrated in FIG. 4, a pair of electrodes 58 is provided on one end of the base 55 in the longitudinal direction X of the base 55. Each electrode 58 is coupled to one end of each resistive heat generator 56 via a power supply line 59. Each resistive heat generator 56 has the other end that is opposite to the one end coupling to each electrode 58. Another power supply line 59 couples the other ends of the two resistive heat generators 56. The insulation layer 57 covers the resistive heat generators 56 and power supply lines 59 to insulate the resistive heat generators 56 and power supply lines 59 from other parts. On the other hand, the electrodes 58 are not covered with the insulation layer 57 and are exposed so that a connector as a power supply terminal to be described later can be coupled.

The base 55 is made of a material having excellent heat resistance and insulating properties, such as polyimide, glass, mica, or ceramic such as alumina or aluminum nitride. Alternatively, the base 55 may include a metal plate made of metal (that is a conductive material) such as steel use stainless (SUS), iron, or aluminum and an insulation layer formed on the metal plate. In particular, the base 55 including the metal plate made of a high thermal conductive material such as aluminum, copper, silver, graphite, or graphene improves the thermal uniformity of the heater 23 and image quality. The insulation layer 57 is made of a material having excellent heat resistance and insulating properties, such as polyimide, glass, mica, or ceramic such as alumina or aluminum nitride. The resistive heat generator 56 is, for example, produced as below. Silver-palladium (AgPd), glass powder, and the like are mixed to make paste. The paste is screen-printed on the surface of the base 55. Thereafter, the base is subject to firing. Then, the resistive heat generator 56 is produced. The material of the resistive heat generator 56 may contain a resistance material, such as silver alloy (e.g., AgPt) or ruthenium oxide (e.g., $RuO_2$). The electrodes 58 and the power supply lines 59 are formed by screen-printing silver (Ag) or silver-palladium (AgPd).

Figure 5:
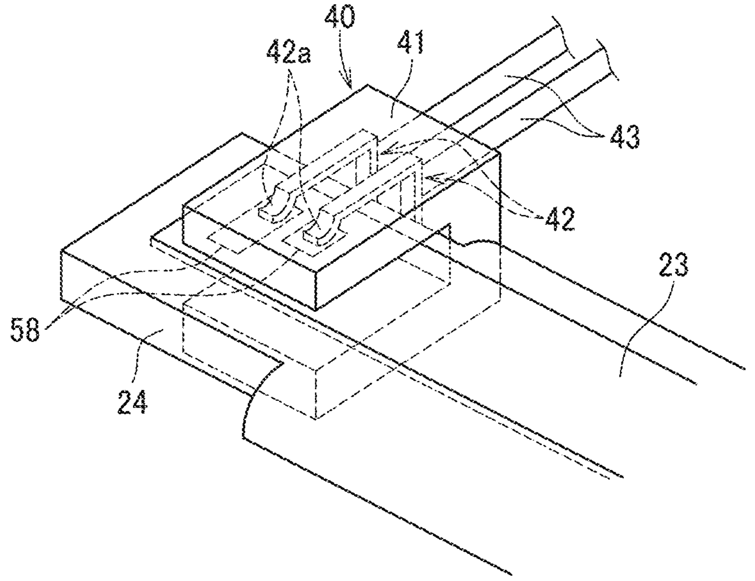
FIG. 5 is a perspective view of a connector as a power supply member coupled to the heater according to an embodiment of the present disclosure.

FIG. 5 is a perspective view of a connector 40 as a power supply member coupled to the heater 23.

As illustrated in FIG. 5, the connector 40 includes a housing 41 made of resin, a plurality of contact terminals 42 disposed in the housing 41, and a harness 43 including wires each coupled each contact terminal 42 to supply power. Each contact terminal 42 is configured by an elastically deformable member such as a plate spring.

As illustrated in FIG. 5, the connector 40 is attached to the heater 23 and the heater holder 24 such that the connector 40 sandwiches the heater 23 and the heater holder 24 together. Thus, the connector 40 holds the heater 23 and the heater holder 24 together. In the above-described state, contact portions 42*a* disposed at ends of the contact terminals 42 in the connector 40 elastically contact and press against the electrodes 58 each corresponding to the contact terminals 42 to electrically couple to the electrodes 58 and contact terminals 42, respectively. As a result, power can be supplied from the power source of the image forming apparatus main body to the heater 23 (each resistive heat generator 56) via the connector 40.

Herein, a configuration of a fixing device according to a comparative example different from embodiments of the present disclosure will be described.

Figure 45:
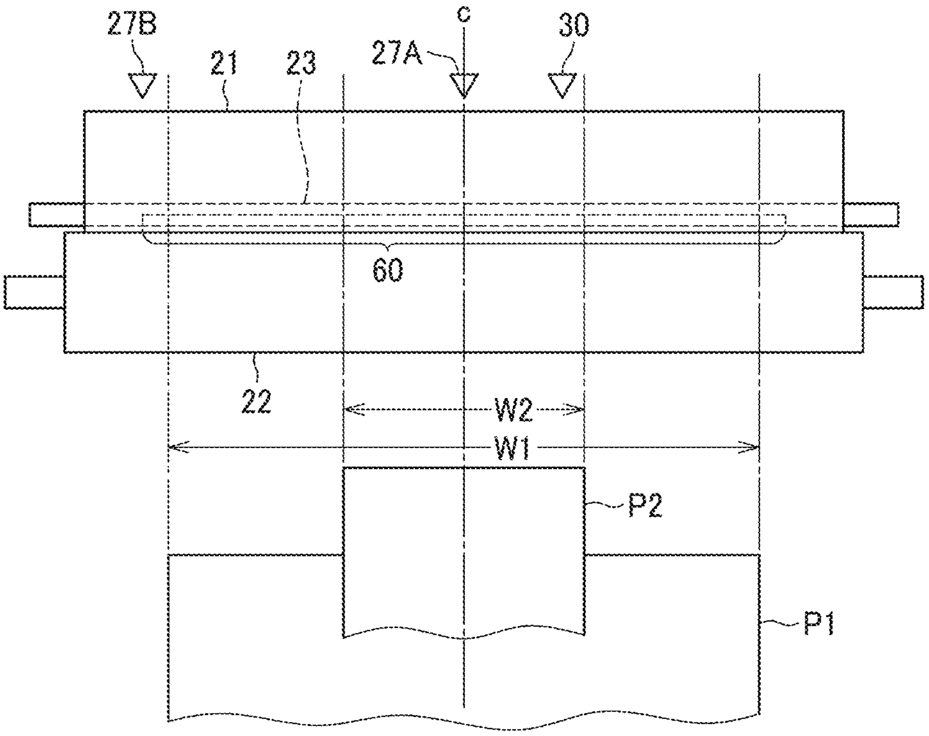
FIG. 45 is a diagram illustrating the configuration of a fixing device according to a comparative example.

In the fixing device illustrated in FIG. 45, the center reference conveyance system is adopted in which sheets P1 and P2 of various width sizes are conveyed with a center c in the width direction as a reference. FIG. 45 illustrates, among various sheets passed through the fixing device, a maximum sheet passing width W1 in which the sheet P1 having the maximum width passes (maximum sheet passing width) and a minimum sheet passing width W2 in which the sheet P2 having the minimum width passes (minimum sheet passing width).

The fixing device according to the comparative example includes a fixing belt 21, a pressure roller 22, a heater 23, and the like, and these components are basically the same as those of the present embodiment described above. The fixing device according to the comparative example also includes a central temperature sensor 27A disposed within the minimum sheet passing width W2 and an end-portion temperature sensor 27B disposed outside the maximum sheet passing width W1. The temperature of the heater 23 or the fixing belt 21 within the sheet passing width (minimum sheet passing width W2) of various sheets is detected by the central temperature sensor 27A, and the heater 23 is controlled on the basis of the detected temperature, whereby the fixing belt 21 is maintained at a predetermined temperature.

In the comparative example, since the center reference conveyance system is adopted, a heat generation area 60 of the heater 23 is arranged symmetrically with respect to the center c of the sheet in the width direction. The heat generation area 60 is disposed over a range equal to or larger than the maximum sheet passing width W1 so that sheets of various widths can be uniformly heated in the width direction. Therefore, there is a disadvantage that if a sheet having a width smaller than the maximum sheet passing width W1 (for example, the sheet P2 having the minimum width) is conveyed, the temperature of the heater 23, the fixing belt 21, and the like rises in a non-sheet passing area where the sheet P2 having a small width does not pass. Examples of causes of excessive temperature rise in the non-sheet passing area include ones described below.

First, one of the causes is erroneous loading of sheets having different thickness. Generally, thick sheets require more heat for image fixing than plain sheets, and thus are conveyed at a lower speed than plain papers. However, if thick sheets thicker than plain sheets are erroneously loaded although plain sheets are to be set, the thick sheets are conveyed at a speed as fast as that of the plain sheets. Therefore, the heat of the fixing belt is deprived more than usual by the thick sheets, and the temperature of the fixing belt decreases. Since the heater generates more heat than usual in order to compensate for the temperature decrease, there is a possibility that the temperature rise in the non-sheet passing area becomes excessive. Unlike the above, if the conveyance speed is not changed between thick sheets and plain sheets, the heater is generally set to generate more heat for thick sheets than plain sheets. Therefore, if plain sheets are erroneously conveyed although thick sheets are to be conveyed, the amount of heat generated by the heater becomes larger than necessary. Therefore, there is a possibility that the temperature rise in the non-sheet passing region becomes excessive.

In addition, if a large amount of toner is attached to the sheet or if a large amount of moisture is contained in the sheet, there is a possibility that the temperature rise in the non-sheet passing area becomes excessive. In these cases, when the sheet passes through the nip, more heat than usual is removed from the fixing belt, so that the heater generates heat to compensate for the removal of heat. As a result, in the non-sheet passing area, heat is more likely to be accumulated than usual, and the temperature rise may be excessive.

Figure 46:
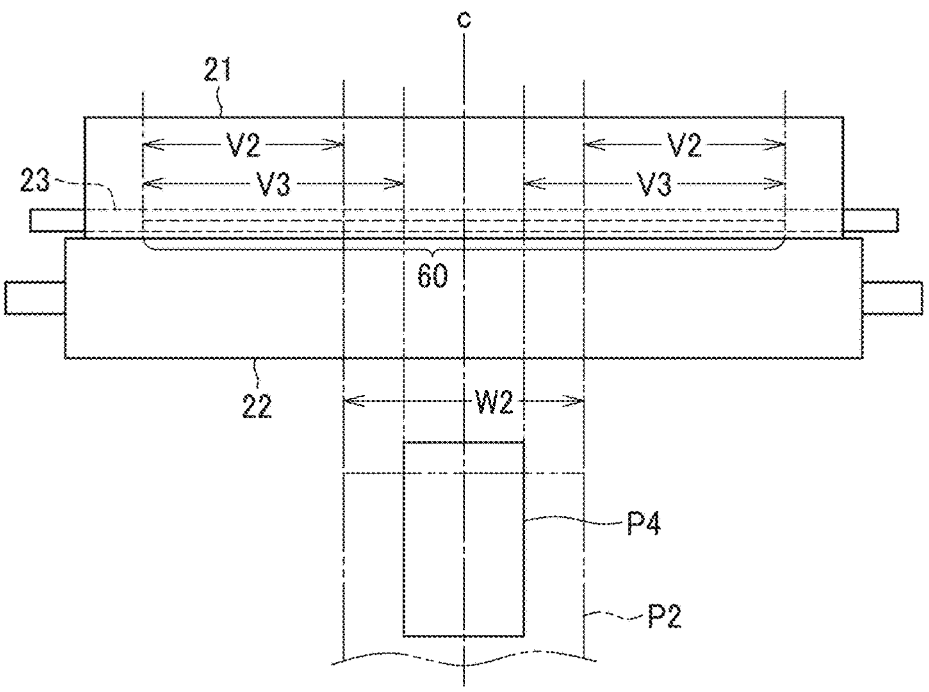
FIG. 46 is a diagram illustrating a case in which a sheet having a size different from an original size is conveyed.
Figure 47:
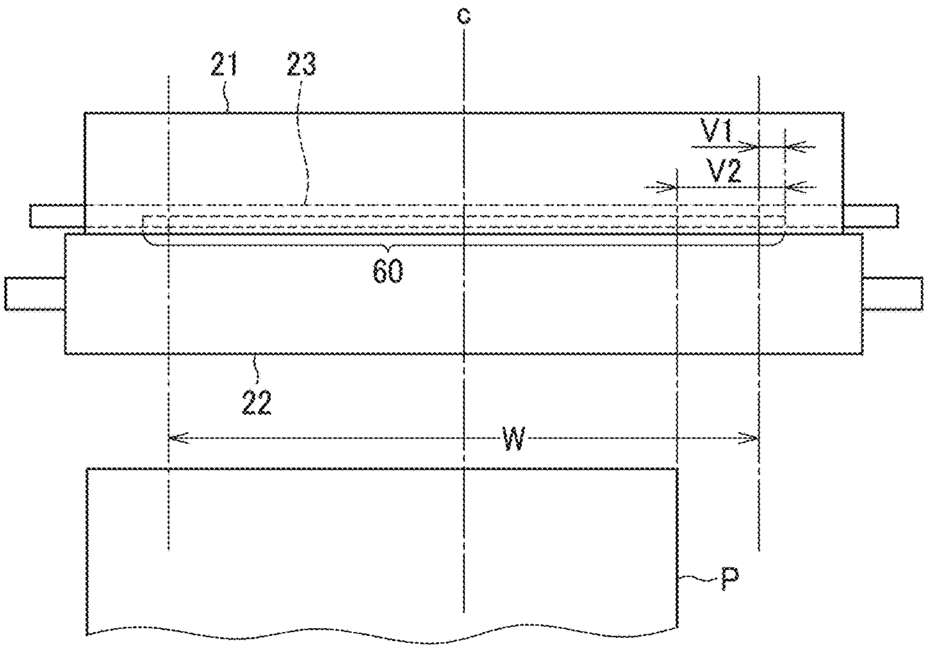
FIG. 47 is a diagram illustrating a case in which a sheet is conveyed with a shift toward one side in a width direction of the sheet.

Furthermore, the temperature rise in the non-sheet passing area may be excessive if sheets of different size are erroneously loaded of if sheets are conveyed with a shift in the width direction. For example, as illustrated in FIG. 46, if a sheet P4 having a smaller width size than the sheet P2 having the minimum width set for each apparatus model is erroneously loaded and the sheet P4 is conveyed, the range of the heat generation area 60 protruding from the sheet passing area increases as compared with the case where the sheet P2 having the minimum width is conveyed (V3>V2). As a result, the amount of heat generation in the non-sheet passing area increases, and there is a possibility that the temperature rise becomes excessive. As illustrated in FIG. 47, if the sheet P is conveyed with a shift from the original conveyance position (range of W in the drawing) to one side in the width direction, the range of the heat generation area 60 protruding from the sheet passing area increases (V2>V1) on the side (right side in the drawing) opposite to the side where the sheet P is shifted. Accordingly, there is a possibility that the temperature rise becomes excessive on the side where a large amount of the heat generation area 60 protrudes. Even if the sheet P is conveyed with a shift to the opposite side (the right side in FIG. 47), the same disadvantage of temperature rise in the non-sheet passing area may occur.

The excessive temperature rise in the non-sheet passing area as described above may cause damage of the fixing belt 21 and the like. For this reason, to prevent the temperature rise in the non-sheet passing area, the printing speed is reduced before the damage occurs.

In the fixing device, in addition to the disadvantage of the temperature rise in the non-sheet passing area, there may be a disadvantage that, when the sheet P1 having the maximum width is passed, heat is not sufficiently applied to both ends in the width direction of the sheet P1 and a fixing failure occurs. In particular, immediately after the warm-up operation of the image forming apparatus is started and the temperature of the fixing belt 21 rises to a predetermined fixing temperature, the amount of heat accumulated in the fixing belt 21 is not sufficient. Therefore, when the sheet P1 having the maximum width passes, the temperature of the fixing belt 21 may decrease on both ends of the maximum sheet passing width W1, and a fixing failure may occur.

In order to cope with such a disadvantage, in the comparative example illustrated in FIG. 45, the end-portion temperature sensor 27B is disposed outside the maximum sheet passing width W1 (non-sheet passing area), and the temperature in the non-sheet passing area is detected by the end-portion temperature sensor 27B. In other words, the temperature in the non-sheet passing area is detected by the end-portion temperature sensor 27B, and if the detected temperature approaches a predetermined temperature (temperature at which damage may occur), control such as reduction of the printing speed is performed to prevent an excessive temperature rise in the non-sheet passing area of the fixing belt 21.

In addition, since the end-portion temperature sensor 27B is provided, it is also possible to solve the disadvantage of temperature decrease of the fixing belt 21 on both ends of the maximum sheet passing width W1. In other words, it is possible to confirm whether the temperature has sufficiently increased on the end portions of the fixing belt 21, by estimating the temperature of the fixing belt 21 on an end portion within the maximum sheet passing width W1 from the temperature of the non-sheet passing area detected by the end-portion temperature sensor 27B. Then, sheet passing is started after confirming that the temperature of the fixing belt 21 has sufficiently increased on the end portions within the maximum sheet passing width W1, thus preventing the temperature decrease on the end portions due to the sheet passing.

In addition, the presence of the end-portion temperature sensor 27B enables detection of erroneous loading of the sheet illustrated in FIG. 46. As illustrated in FIG. 46, if a sheet P4 with a small width is erroneously loaded and conveyed, the range of the heat generation area 60 protruding from the sheet passing area increases (V3>V2), so that the temperature in the non-sheet passing area tends to rise more than usual. Therefore, erroneous loading can be detected by detecting the temperature rise by the end-portion temperature sensor 27B.

Figure 48:
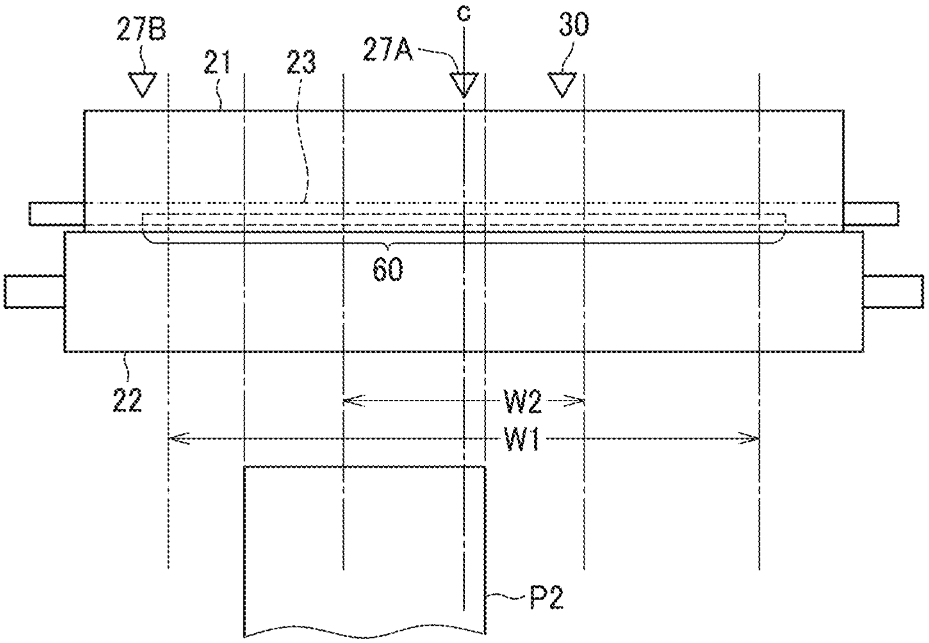
FIG. 48 is a diagram illustrating a case in which a sheet having a minimum width is conveyed with a shift toward one side in a width direction of the sheet.

Furthermore, in the comparative example, a sheet sensor 30 (see FIG. 45) is provided in order to detect the positional shift of the sheet. In the example illustrated in FIG. 45, since the sheet sensor 30 is disposed within the minimum sheet passing width W2, when the sheet P2 with the minimum width is passed, sheet passing is detected by the sheet sensor 30. On the other hand, as illustrated in FIG. 48, if the sheet P2 having the minimum width is conveyed with a shift from the original conveyance position (minimum sheet passing width W2) to the end-portion temperature sensor 27B side (left side in the drawing), the sheet P2 does not pass through the position of the sheet sensor 30, and the sheet sensor 30 does not detect the sheet P2. Therefore, the positional shift of the sheet P2 can be detected from the change in the detection signal of the sheet sensor 30 at this time. If the positional shift of the sheet P2 is detected, an excessive temperature rise in the non-sheet passing area can be prevented by executing control such as lowering the printing speed. If the image formation is stopped when the positional shift is detected, the image formation is no longer performed on the subsequent shifted sheets, so that wasteful consumption of the sheets and toner can be prevented.

Figure 49:
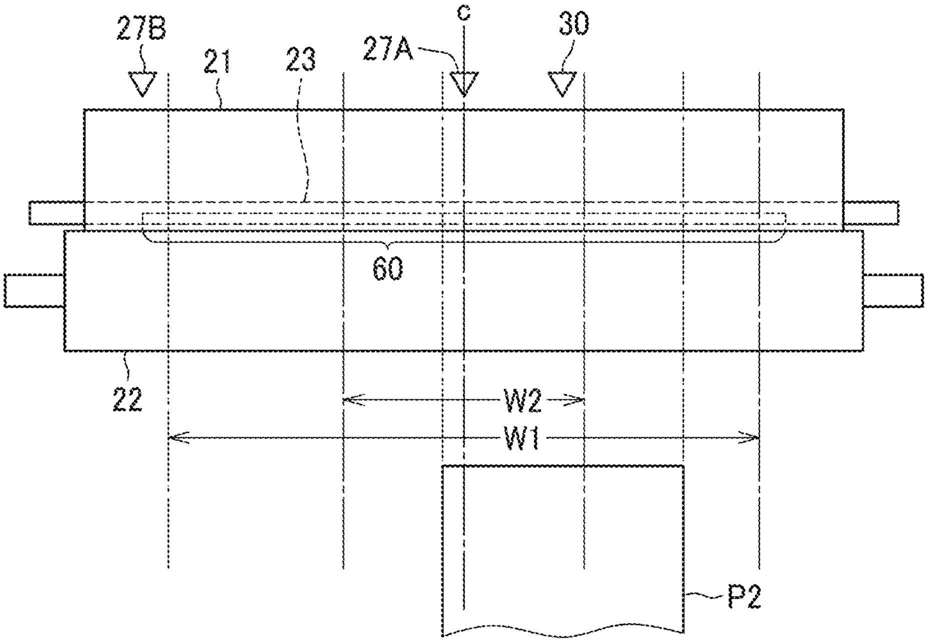
FIG. 49 is a diagram illustrating a case in which a sheet having a minimum width is conveyed with a shift toward the other side in the width direction of the sheet.

If the sheet sensor 30 as described above is arranged at a plurality of positions, it is possible to detect various positional shifts of sheets. However, there is a disadvantage that increasing the number of sheet sensors leads to cost increase. In this regard, in the comparative example, only one sheet sensor 30 is disposed on one side of the sheet conveyance reference c to achieve cost reduction. In this case, however, as illustrated in FIG. 49, there is a disadvantage that, if the sheet P2 having the minimum width is conveyed with a shift to the opposite side (right side in the drawing) to the above, the sheet sensor 30 cannot detect the positional shift of the sheet. For example, in this case, since the sheet P2 is detected by the sheet sensor 30 as in the normal state where there is no positional shift of the sheet (see FIG. 45), there is no change in the detection signal from the sheet sensor 30, and the positional shift of the sheet cannot be detected by the sheet sensor 30. In this case, since the sheet P2 is shifted in the direction away from the end-portion temperature sensor 27B, if the sheet in the shifted state is continuously conveyed, the temperature of the non-sheet passing area on the end-portion temperature sensor 27B side gradually increases and becomes higher than usual. Therefore, it is possible to detect the positional shift of the sheet by detecting the temperature rise at this time by the end-portion temperature sensor 27B. However, since the positional shift of the sheet cannot be detected until the temperature of the non-sheet passing area rises to a temperature higher than usual, it is not possible to prevented an excessive temperature rise in the non-sheet passing area at an early stage, so that the image formation on the shifted sheet cannot be quickly stopped. Therefore, there is a disadvantage that wasteful consumption of the sheets and toner cannot be effectively prevented.

Therefore, in an embodiment of the present disclosure described below, the following configuration is adopted in order to solve the above-described disadvantages such as the detection of the positional shift of the sheet while achieving cost reduction. Hereinafter, features of the present embodiment will be described.

Figure 6:
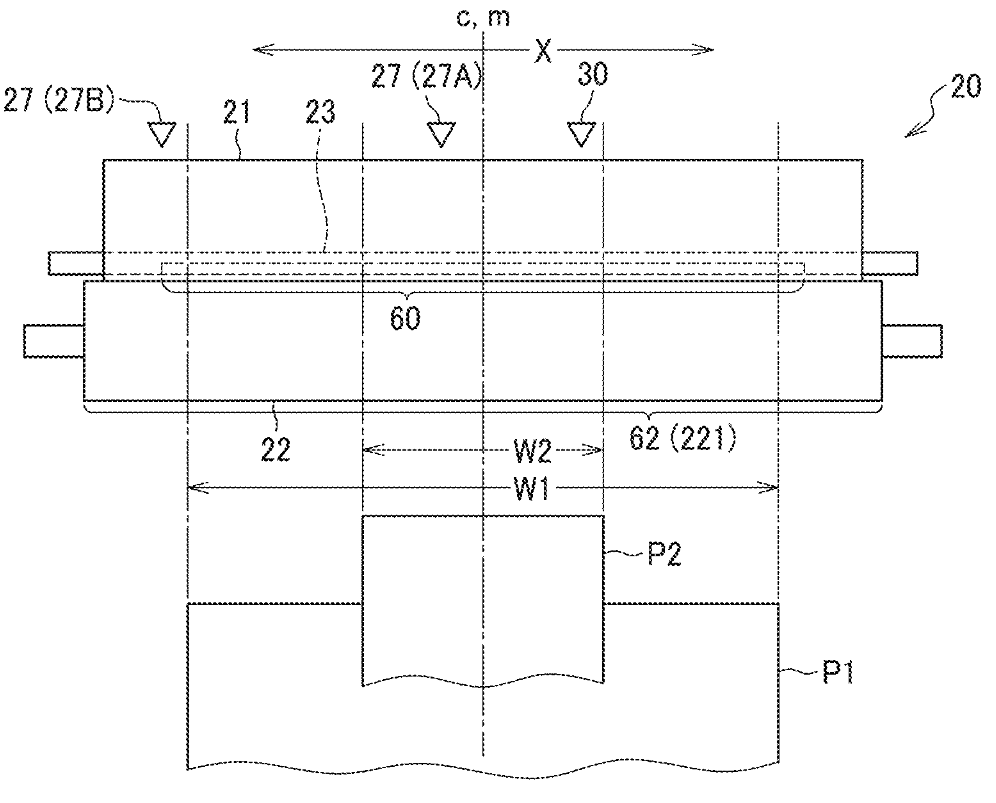
FIG. 6 is a diagram illustrating a positional relationship among the heater, each temperature sensor, and a sheet sensor with respect to each sheet passing area according to an embodiment of the present disclosure.

FIG. 6 is a diagram illustrating a positional relationship among the heater 23, each temperature sensor 27, and the sheet sensor 30 with respect to each of the sheet passing areas P1 and P2 according to the present embodiment.

FIG. 6 illustrates, among various sheets passed through the fixing device, a maximum sheet passing width W1 in which the sheet P1 having the maximum width passes (maximum sheet passing width) and a minimum sheet passing width W2 in which the sheet P2 having the minimum width passes (minimum sheet passing width). Furthermore, FIG. 6 illustrates a center c in the width direction that serves as a conveyance reference of sheets of various width sizes. As described above, in the present embodiment, as in the above-described comparative example, the center reference conveyance method is adopted in which sheets of various width sizes are conveyed with the center c in the width direction as a reference. For this reason, the heat generation area 60 of the heater 23 is arranged so as to be symmetrical with respect to the center c in the width direction of various sheets over a range equal to or larger than the maximum sheet passing width W1. The fixing belt 21 and a roller part 62 (part of the elastic layer 221) of the pressure roller 22 are also arranged so as to be symmetrical with respect to the center c in the width direction of various sheets. Therefore, in the present embodiment, a center m of the heat generation area 60 in the longitudinal direction X of the heater 23, the center in the longitudinal direction of the fixing belt 21, and the center in the axial direction of the roller part 62 of the roller 22 are all set at the same position as the center c in the width direction of various sheets. The "heat generation area" of the heater 23 means an area in which the resistive heat generator is disposed in the longitudinal direction X of the heater 23. If a plurality of resistive heat generators is disposed in the longitudinal direction X as illustrated in an example described later (see FIG. 23), the "heat generation area" means a range from one end to the other end of the area in which all the resistive heat generators are disposed.

The "maximum sheet passing width" in the present specification means the width of a preset area through which a sheet having the maximum width is assumed to pass regardless of whether the sheet having the maximum width actually passes. Specifically, the maximum sheet passing width W1 ranges from the center m of the heat generation area 60, or from the center in the longitudinal direction of the fixing belt 21, or from the center in the axial direction of the roller part 62 of the pressure roller 22 to a position separated by a distance of half of the maximum width of the sheet or a distance obtained by adding 5 mm to the distance of half of the maximum width. For example, if the sheet having the maximum width has an A4 size (width: 210 mm), the maximum sheet passing width ranges from the center m of the heat generation area 60 to a position separated by 105 mm, which is a half of the A4 size, toward both ends, or a position separated by 110 mm, which is obtained by adding 5 mm to 105 mm. Similarly to the maximum sheet passing width, the "minimum sheet passing width" in the present specification also means a preset area through which the sheet having the minimum width is assumed to pass regardless of whether the sheet having the minimum width actually passes. For example, the minimum sheet passing width ranges from the center m of the heat generation area 60, or from the center in the longitudinal direction of the fixing belt 21, or from the center in the axial direction of the roller part 62 of the pressure roller 22 to a position separated by a distance of half of the minimum width of the sheet or a distance obtained by adding 5 mm to the distance of half of the minimum width.

As illustrated in FIG. 6, in the present embodiment, one each temperature sensor 27 that detects the temperature of the heater 23 is disposed inside the minimum sheet passing width W2 and outside the maximum sheet passing width W1.

Among the two temperature sensors 27, a temperature sensor 27B disposed outside the maximum sheet passing width W1 is the end-portion temperature sensor 27B (first temperature detection member) disposed on one end in the longitudinal direction with respect to the center of the heat generation area 60. The end-portion temperature sensor 27B may include a detector that detects the temperature, a holder that holds the detector, and the like. At least the detector of the end-portion temperature sensor 27B is disposed outside the maximum sheet passing width W1.

On the other hand, a temperature sensor 27A disposed inside the minimum sheet passing width W2 is the central temperature sensor 27A (second temperature detection member) disposed closer to the center m side of the heat generation area 60 than the end-portion temperature sensor 27B. The central temperature sensor 27A is disposed at a position shifted toward the end-portion temperature sensor 27B side from the center m of the heat generation area 60, in other words, the center in the longitudinal direction of the fixing belt 21 or the center in the axial direction of the roller part 62 of the pressure roller 22. In the central temperature sensor 27A, at least a detector that detects the temperature is disposed at a position shifted from the center m of the heat generation area 60 toward the end-portion temperature sensor 27B within the minimum sheet passing width W2.

As illustrated in FIG. 6, the fixing device 20 according to the present embodiment is provided with a sheet sensor 30 as a sheet detection member. The sheet sensor 30 is a non-contact sensor or the like that detects a sheet passing through the nip, and is disposed on the side opposite to the side on which the end-portion temperature sensor 27B is provided with reference to the center m of the heat generation area 60 and inside the minimum sheet passing width W2. The sheet sensor 30 may also include a detector that detects the sheet, a holder that holds the detector, and the like. At least the detector is disposed on the side opposite to the side on which the end-portion temperature sensor 27B is provided with reference to the center m of the heat generation area 60 and inside the minimum sheet passing width W2.

In the fixing device 20 according to the present embodiment, the arrangement of the central temperature sensor 27A is different from that of the comparative example. For example, in the comparative example, the central temperature sensor 27A is disposed at the center c of the sheet passing width of various sheets (see FIG. 45), whereas in the present embodiment, the central temperature sensor 27A is disposed at a position shifted from the center c of the sheet passing width (the center m of the heat generation area 60) toward the end-portion temperature sensor 27B.

Figure 7:
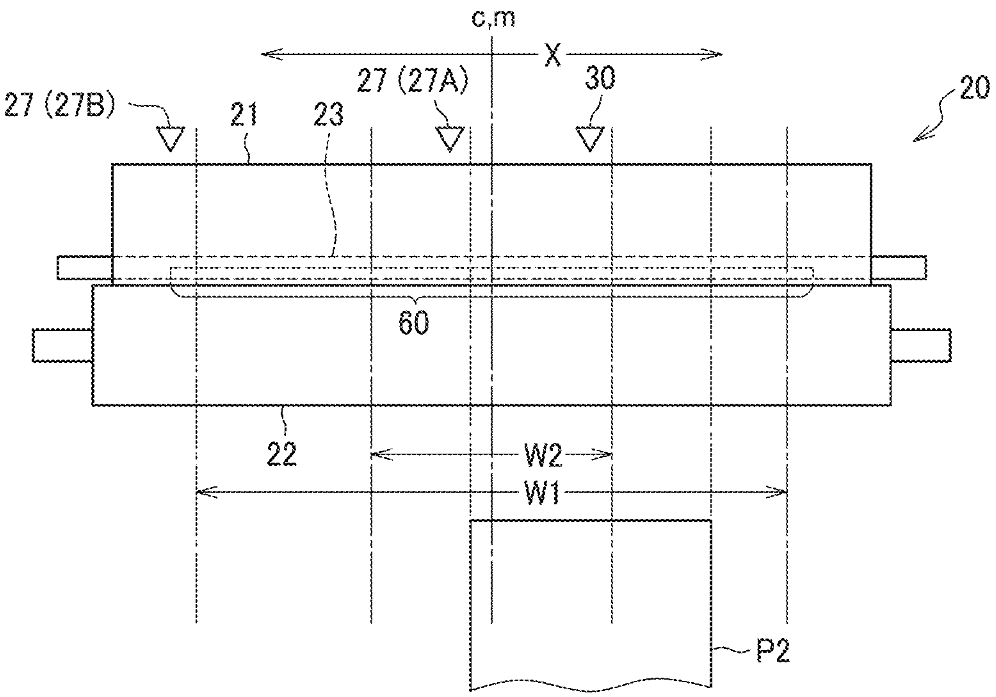
FIG. 7 is a diagram illustrating a case in which a sheet is conveyed with a shift toward one side in a width direction of the sheet.

As described above, in the present embodiment, the central temperature sensor 27A is disposed at a position shifted from the center c of the sheet passing width (the center m of the heat generation area 60) toward the end-portion temperature sensor 27B. Thus, the position shift of the sheet, which would be difficult to detect in the comparative example, can be detected. For example, in the present embodiment, the central temperature sensor 27A is disposed at the position shifted from the center m of the heat generation area 60 toward the end-portion temperature sensor 27B. Accordingly, as illustrated in FIG. 7, if the sheet P2 having the minimum width is shifted toward the end-portion temperature sensor 27B (the right side in the drawing), the central temperature sensor 27A can be positioned in the non-sheet passing area unlike the normal time (with no positional shift of the sheet). On the other hand, in the comparative example, the central temperature sensor 27A is disposed at the center c of the sheet passing width. Accordingly, even if the sheet P2 having the minimum width is shifted in the same manner, the central temperature sensor 27A is not positioned in the non-sheet passing area (see FIG. 49).

As described above, in the present embodiment, the central temperature sensor 27A is positioned in the non-sheet passing area where the temperature easily rises (see FIG. 7), so that the temperature detected by the central temperature sensor 27A becomes higher than the temperature detected at the normal time. As a result, in the normal state, the difference in detected temperature between the central temperature sensor 27A and the end-portion temperature sensor 27B becomes relatively large, but in the event of a positional shift, the detected temperature difference between the central temperature sensor 27A and the end-portion temperature sensor 27B becomes small. Therefore, the positional shift of the sheet can be detected by grasping the difference in the detected temperature difference at this time. In this case, since the positional shift of the sheet can be grasped from the difference in detected temperature from the end-portion temperature sensor 27B before the temperature in the non-sheet passing area excessively rises, the positional shift of the sheet can be detected at an early stage as compared with the comparative example.

As described above, in the present embodiment, moving the central temperature sensor 27A toward the end-portion temperature sensor 27B side from the center m of the heat generation area 60 makes it possible to detect at an early stage the positional shift of the sheet P2 having the minimum width toward the end-portion temperature sensor 27B. As a result, if the positional shift of the sheet is detected, the excessive temperature rise in the non-sheet passing area of the fixing belt 21 can be prevented at an early stage by performing control such as lowering the printing speed. In addition, the image forming in the shifted state can be stopped early so that wasteful consumption of the sheets and toner can be prevented. In addition to the positional shift detection (positional shift determination) based on the difference in detected temperature between the central temperature sensor 27A and the end-portion temperature sensor 27B, the control of the printing speed, the stoppage of image forming, and the like are performed by a controller provided in the image forming apparatus.

In the present embodiment, the same operations and advantageous effects as those of the comparative example can be obtained.

Figure 8:
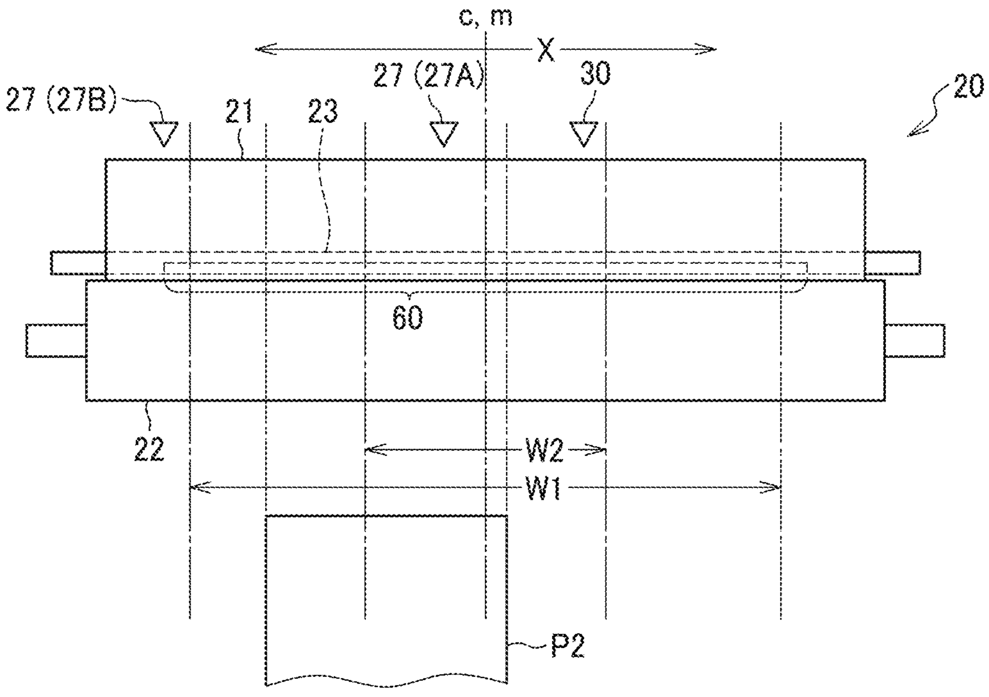
FIG. 8 is a diagram illustrating a case in which the sheet conveyed with a shift toward the other side in the width direction of the sheet.

For example, as illustrated in FIG. 8, in the present embodiment, if the sheet P2 having the minimum width is conveyed with a shift from the original conveyance position (minimum sheet passing width W2) toward the end-portion temperature sensor 27B side (left side in the drawing), the sheet P2 does not pass through the position of the sheet sensor 30, so that the positional shift of the sheet P2 can be detected from a change in the detection signal of the sheet sensor 30 at this time. In this case, since the sheet sensor 30 can detect the positional shift of the sheet at the time when the first sheet is conveyed, it is possible to stop sheet feeding and image forming at an early stage, and it is possible to effectively prevent wasteful consumption of the sheets and the toner.

Figure 9:
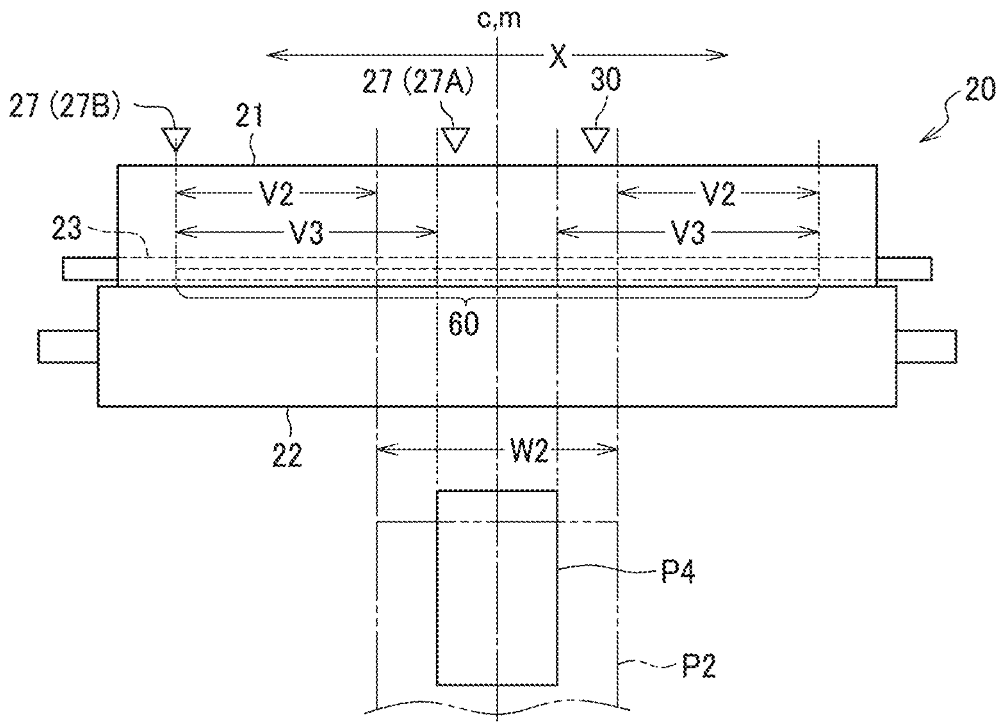
FIG. 9 is a diagram illustrating a case in which a sheet having a size different from an original size is conveyed.

As illustrated in FIG. 9, in the present embodiment, if the sheet P4 smaller in width smaller than the sheet P2 having the minimum width is erroneously conveyed, the range of the heat generation area 60 protruding from the sheet passing area increases (V3>V2), so that the temperature in the non-sheet passing area becomes higher than usual. Therefore, the end-portion temperature sensor 27B detects the temperature rise at this time, whereby the erroneous loaded can be detected. In addition, in the case of the example illustrated in FIG. 9, since the sheet P4 erroneously conveyed does not pass through the position of the sheet sensor the erroneous loading can also be detected on the basis of the detection signal of the sheet sensor 30. For example, if the sheet P2 having the minimum width is conveyed, the sheet P2 is detected by the sheet sensor 30. However, if the sheet P4 smaller in width than the sheet P2 having the minimum width is erroneously conveyed, the sheet sensor 30 does not detect the sheet P4. Therefore, the erroneous loading can be set from a change in the detection signal of the sheet sensor 30 at this time. In the example illustrated in FIG. 9, the central temperature sensor 27A is positioned in the sheet passing area of the sheet P4, but the central temperature sensor 27A may be positioned in the non-sheet passing area depending on the size of the sheet. In this case, since the temperature detected by the central temperature sensor 27A becomes higher than usual, the erroneous loading can also be detected from a change in the detection signal of the central temperature sensor 27A at this time.

In addition, also in the present embodiment, the end-portion temperature sensor 27B is arranged outside the maximum sheet passing width W1 (non-sheet passing area), so that the temperature rise in the non-sheet passing area can be detected by the end-portion temperature sensor 27B. If the temperature detected by the end-portion temperature sensor 27B approaches a predetermined temperature (temperature at which damage may occur), an excessive temperature rise in the non-sheet passing area can be prevented by performing a control such as lowering the printing speed.

Since the end-portion temperature sensor 27B is provided, the disadvantage of temperature decrease of the fixing belt 21 on both ends of the maximum sheet passing width W1 can also be overcome. In other words, it is possible to prevent the temperature decrease on both ends due to sheet passing by estimating the temperature of the fixing belt 21 on the end portion within the maximum sheet passing width W1 from the temperature of the non-sheet passing area detected by the end-portion temperature sensor 27B, and then starting sheet passing after confirming that the temperature of the fixing belt 21 on the end portion within the maximum sheet passing width W1 has sufficiently increased.

Figure 10:
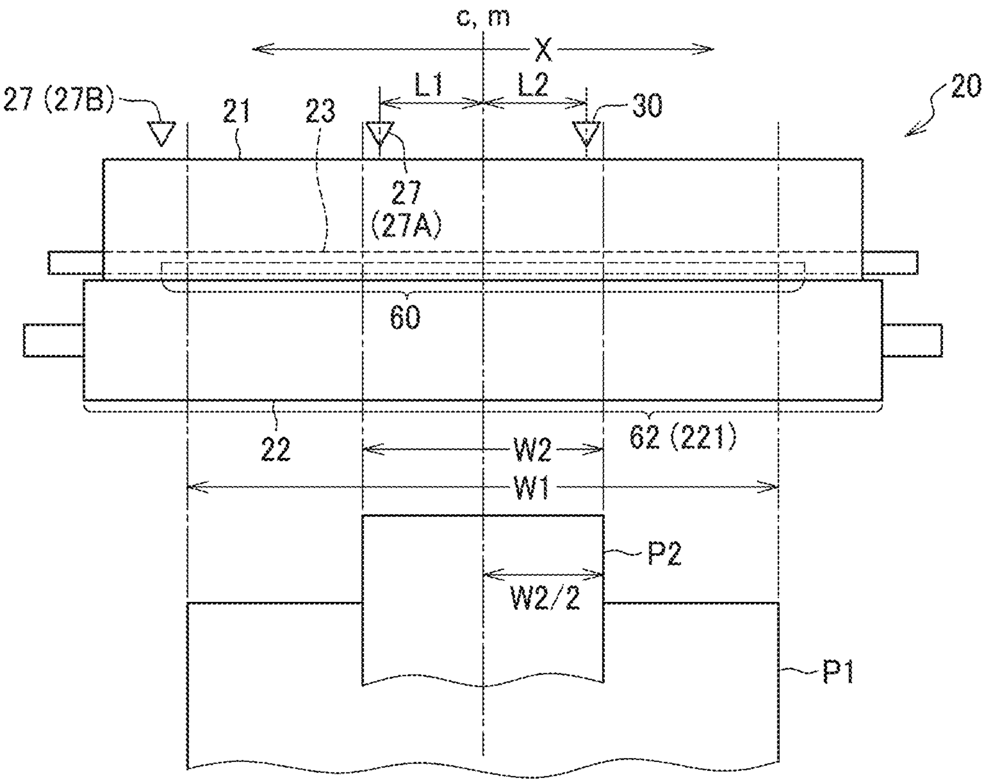
FIG. 10 is a diagram illustrating the arrangement of a central temperature sensor and a sheet sensor, according to an embodiment of the present disclosure.

In the example illustrated in FIG. 7, if the sheet P2 having the minimum width is conveyed with a shift toward the right side in the drawing, the central temperature sensor 27A is positioned in the non-sheet passing area. However, if the amount of shift of the sheet P2 in the width direction is small, the central temperature sensor 27A may not be positioned in the non-sheet passing area. Similarly, as illustrated in FIG. 8, in a case where the sheet P2 having the minimum width is conveyed with a shift toward the left side of the drawing, if the shift amount of the sheet P2 is small, the sheet sensor 30 may not be positioned in the non-sheet passing area. Even in such a case, in order to widely detect the positional shift of the sheet, it is preferable to arrange the central temperature sensor 27A and the sheet sensor 30 in the vicinity of both ends within the range of the minimum sheet passing width W2 as illustrated in FIG. 10 such that the central temperature sensor 27A or the sheet sensor 30 is positioned in the non-sheet passing area even with a small amount of positional shift of the sheet. In other words, if the central temperature sensor 27A and the sheet sensor 30 are separated from each other as much as possible and the distance (L1+L2) between them is long, the positional shift of the sheet can be detected widely.

Specifically, referring to FIG. 10, the sum of the distances (L1+L2) is preferably longer than a half length (W2/2) of the minimum sheet passing width W2 where the distance between the center m of the heat generation area 60 and the central temperature sensor 27A in the longitudinal direction X of the heater 23 is L1 and the distance between the center m of the heat generation area 60 and the sheet sensor 30 in the longitudinal direction X of the heater 23 is L2. Thus, the positional shift of the sheet can be widely detected. The distance L1 between the center m of the heat generation area 60 and the central temperature sensor 27A and the distance L2 between the center m of the heat generation area 60 and the sheet sensor 30 refers to the distance from the center m of the heat generation area 60 to the detector of the central temperature sensor 27A or the detector of the sheet sensor 30. The same applies to the distances L1 and L2 in the following description.

In addition, the magnitude relationship between the distance L1 between the center m of the heat generation area 60 and the central temperature sensor 27A and the distance L2 between the center m of the heat generation area 60 and the sheet sensor 30 can be set as appropriate according to the direction in which the positional shift of the sheet is likely to occur.

Figure 11:
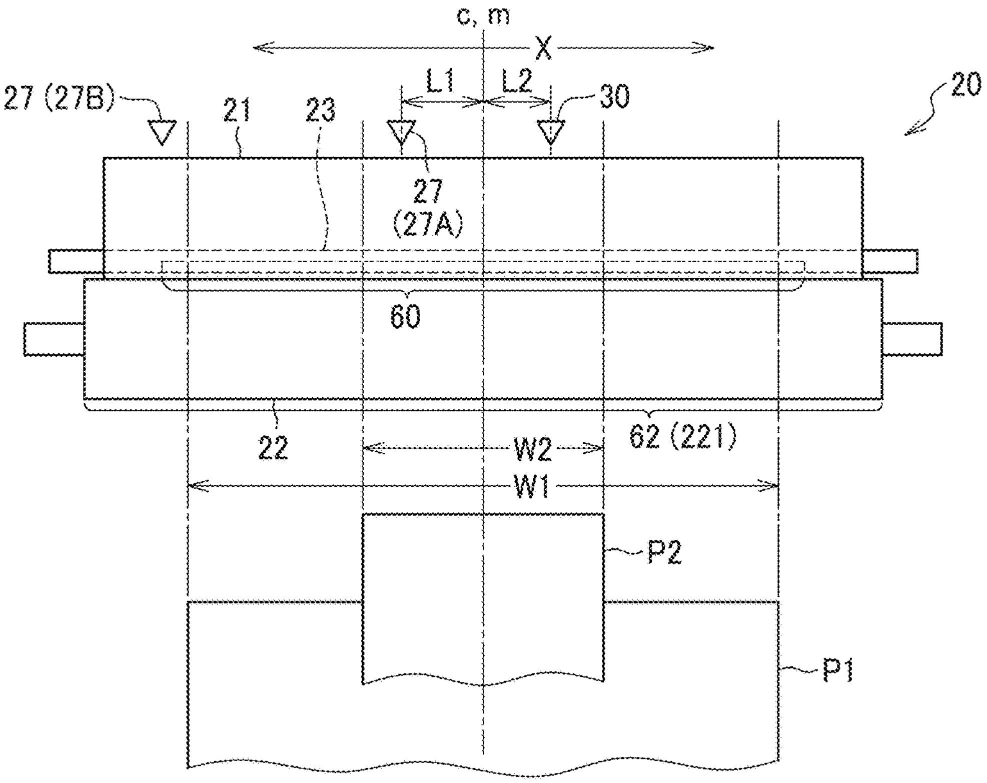
FIG. 11 is a diagram illustrating the arrangement of the central temperature sensor and the sheet sensor, according to an embodiment of the present disclosure.

For example, as in the example illustrated in FIG. 11, if the distance L1 between the center m of the heat generation area 60 and the central temperature sensor 27A is longer than the distance L2 between the center m of the heat generation area 60 and the sheet sensor 30 (L1>L2), the central temperature sensor 27A is disposed closer to the end (left end) of the minimum sheet passing width W2 than the sheet sensor 30, so that the positional shift of the sheet can be easily detected by the central temperature sensor 27A.

Figure 12:
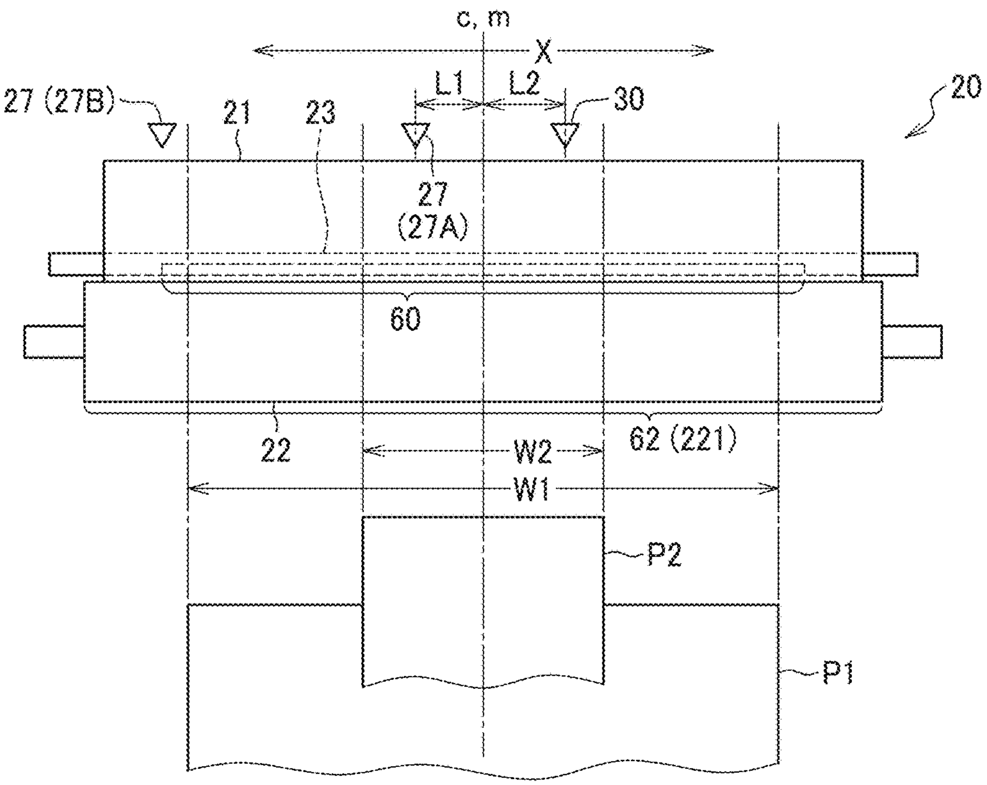
FIG. 12 is a diagram illustrating the arrangement of the central temperature sensor and the sheet sensor, according to an embodiment of the present disclosure.

On the other hand, as in the example illustrated in FIG. 12, if the distance L2 between the center m of the heat generation area 60 and the sheet sensor 30 is made longer than the distance L1 between the center m of the heat generation area 60 and the central temperature sensor 27A (L1<L2), the sheet sensor 30 is disposed closer to the end (right end) of the minimum sheet passing width W2 than the central temperature sensor 27A, so that the positional shift of the sheet can be easily detected by the sheet sensor 30. In this case, since the central temperature sensor 27 is disposed close to the center c of the minimum sheet passing width W2, it is possible to accurately detect the temperature in the sheet passing area (minimum sheet passing width W2) if the sheet P2 having the minimum width is conveyed without positional shift. In other words, the temperature detected by the central temperature sensor 27A is less likely to be affected by the temperature rise outside the minimum sheet passing width W2 (non-sheet passing area), so that the temperature in the sheet passing area (minimum sheet passing width W2) can be accurately detected.

In the above-described embodiments and modifications of the present disclosure described above, the positional shift of the sheet P2 having the minimum width is detected by the central temperature sensor 27A and the sheet sensor 30 as an example. However, the present disclosure is not limited to the case where the positional shift of the sheet P2 having the minimum width is detected.

Figure 13:
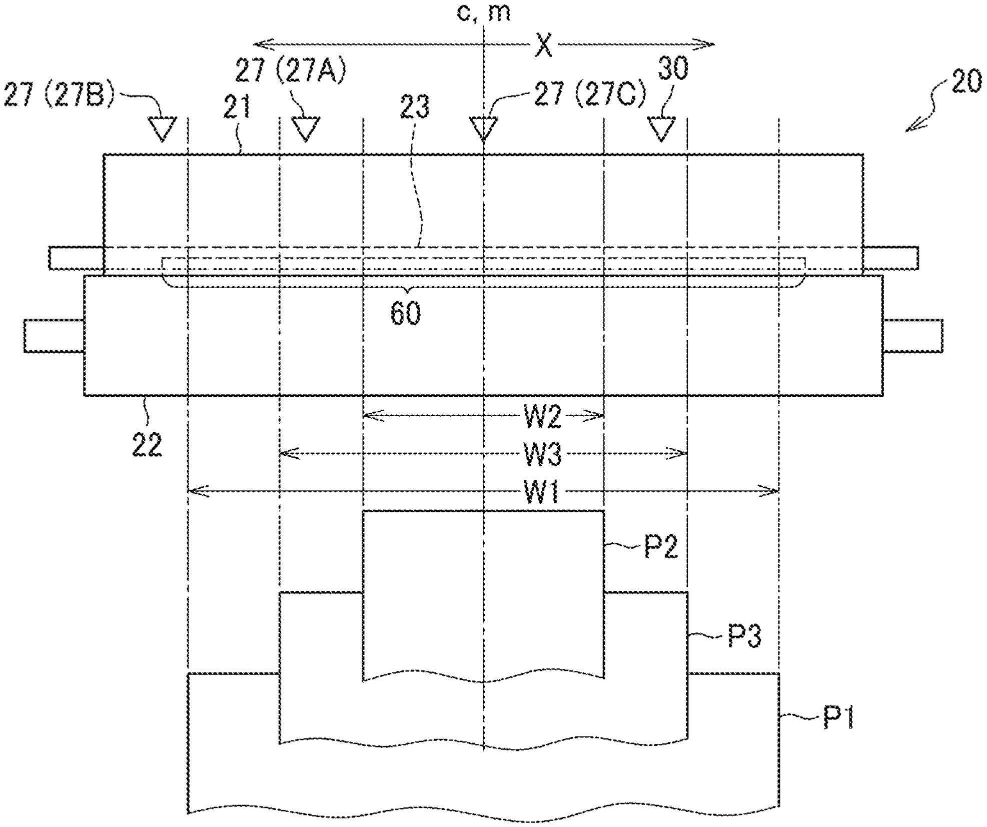
FIG. 13 is a diagram illustrating the arrangement of the center side temperature sensor and the sheet sensor that corresponds to a sheet having an intermediate width, according to an embodiment of the present disclosure.

For example, as in the example illustrated in FIG. 13, the central temperature sensor 27A and the sheet sensor 30 may be arranged corresponding to a sheet P3 having an intermediate width larger than the sheet P2 having the minimum width and smaller than the sheet P1 having the maximum width. In this case, the central temperature sensor 27A and the sheet sensor 30 are disposed outside the minimum sheet passing width W2 and within an intermediate sheet passing width W3 through which the sheet P3 having the intermediate width passes. In the example illustrated in FIG. 13, in order to detect the temperature in the sheet passing area of various sheets, a temperature sensor 27C as a third temperature detection member is disposed at a center m of the minimum sheet passing width W2.

Figure 14:
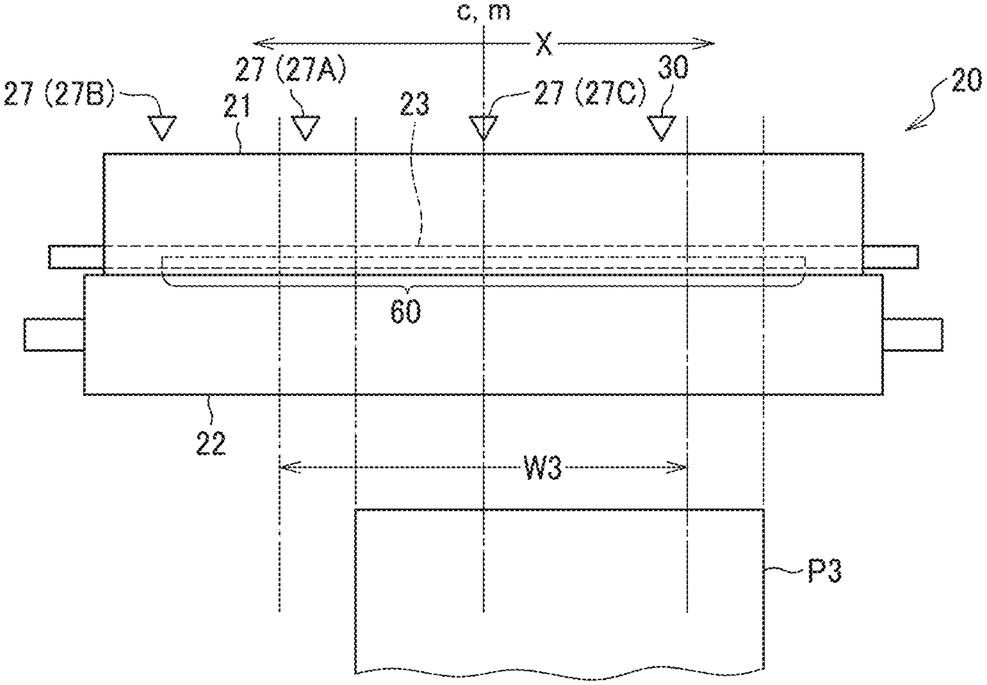
FIG. 14 is a diagram illustrating a case in which the sheet having an intermediate width is conveyed with a shift toward one side in a width direction of the sheet.
Figure 15:
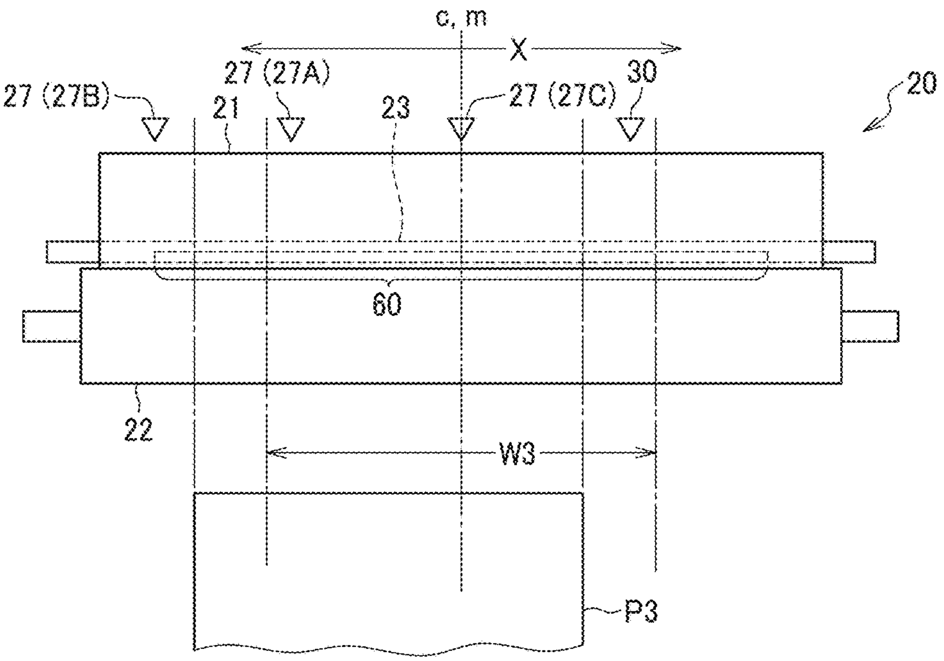
FIG. 15 is a diagram illustrating a case in which the sheet having an intermediate width is conveyed with a shift toward the other side in the width direction of the sheet.

In this case, if the sheet P3 having the intermediate width is conveyed with a shift from the sheet passing area (intermediate sheet passing width W3) in which the sheet P3 is originally to be conveyed toward the end-portion temperature sensor 27B side (right side in the drawing) as illustrated in FIG. 14 because the central temperature sensor 27A and the sheet sensor 30 are disposed at positions corresponding to the sheet P3 having the intermediate width, the central temperature sensor 27A is positioned in the non-sheet passing area unlike at the normal time (without positional shift of the sheet). Therefore, the position shift of the sheet can be detected from the change in the temperature detected by the central temperature sensor 27A. In other words, the temperature detected by the central temperature sensor 27A becomes higher than that at the normal time, and the detected temperature difference between the central temperature sensor 27A and the end-portion temperature sensor 27B becomes small. Therefore, it is possible to detect the positional shift of the sheet by grasping the difference in the detected temperature difference at this time. In addition, as illustrated in FIG. 15, if the sheet P3 having the intermediate width is conveyed with a shift toward the end-portion temperature sensor 27B side (the left side in the drawing), the sheet P3 does not pass through the position of the sheet sensor 30, so that the positional shift of the sheet can be detected from the change in the detection signal of the sheet sensor 30 at this time.

As described above, changing the arrangement of the central temperature sensor 27A and the sheet sensor 30 as appropriate according to the type of sheet makes it possible to detect the positional shift of the sheet other than the sheet P2 having the minimum width. The central temperature sensor 27A and the sheet sensor 30 may be disposed at positions corresponding to any other sheet passing width without being limited to the intermediate sheet passing width W3.

Each of the temperature sensors 27 such as the central temperature sensor 27A and the end-portion temperature sensor 27B may not detect only the temperature of the heater 23 but may also detect the temperature of the fixing belt 21 or the pressure roller 22. Even if these temperature sensors 27 detect the temperature of the fixing belt 21 or the pressure roller 22, the same operations and advantageous effects as those of the above embodiment can be obtained.

Figure 16:
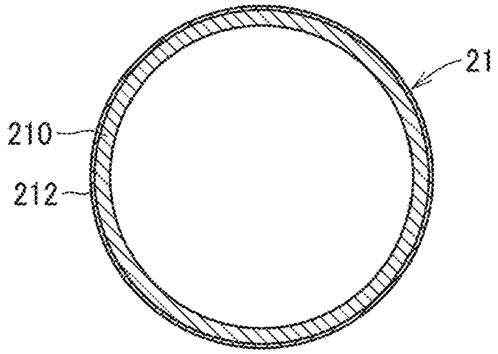
FIG. 16 is a cross-sectional view of a fixing belt having no elastic layer, according to an embodiment of the present disclosure.

As in the example illustrated in FIG. 16, the fixing belt 21 may be a belt including the base 210 and the surface layer (release layer) 212 provided on the outer peripheral side of the base 210. In this case, since the elastic layer such as a rubber layer is not provided between the surface layer (release layer) 212 and the base 210, the heat insulating property is low and the thermal conductivity from the heater to the surface (outer peripheral surface) of the fixing belt is good as compared with the fixing belt having the elastic layer. However, on the other hand, it is considered that the temperature rise of the fixing belt 21 in the non-sheet passing area becomes remarkable. Therefore, in some embodiments, a fixing device may include the fixing belt 21 not having such an elastic layer. Such a configuration can accurately detect the temperature rise of the non-sheet passing area due to the positional shift of the sheet, this preventing the damage of the fixing belt 21 more reliably.

In some embodiments of the present disclosure, fixing devices may have configurations as illustrated in FIGS. 17 to 20. In the following description, the configurations of the fixing devices illustrated in FIGS. 17 to 20 will be described.

Figure 17:
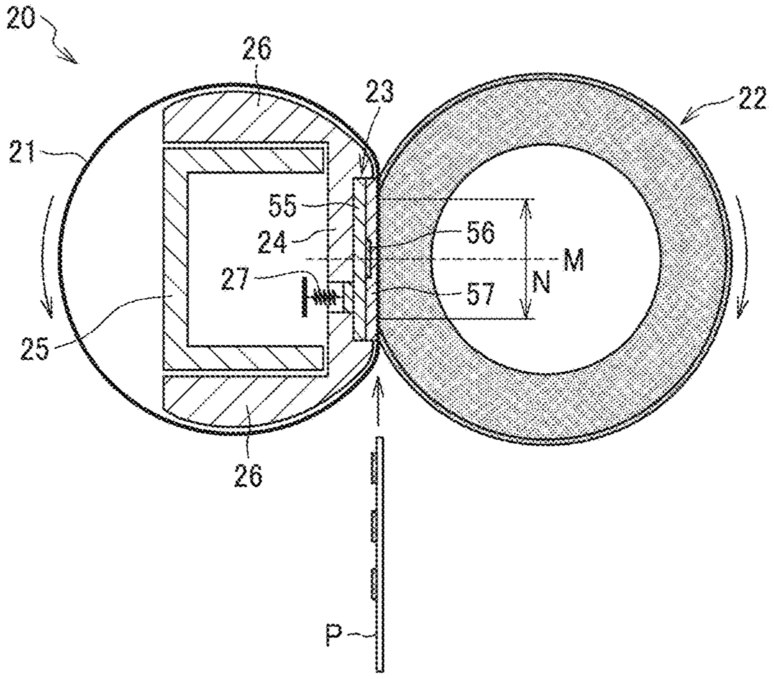
FIG. 17 is a diagram illustrating a configuration of a fixing device according to an embodiment of the present disclosure.

A different point between the fixing device 20 illustrated in FIG. 17 and the fixing device 20 illustrated in FIG. 2 is the position of the temperature sensor 27 to detect the temperature of the heater 23. Other than that, the configuration illustrated in FIG. 17 is the same as that in FIG. 2. In the fixing device 20 illustrated in FIG. 17, the temperature sensor 27 is disposed upstream from the center M of the fixing nip N in the sheet passing direction (i.e., near a nip entrance). In the fixing device 20 illustrated in FIG. 2, the temperature sensor 27 is disposed at the center M of the fixing nip N. The temperature sensor 27 disposed upstream from the center M of the fixing nip N in the sheet passing direction as illustrated in FIG. 17 can accurately detect the temperature near the nip entrance. Since the sheet P entering the fixing nip N particularly easily take away heat of the fixing belt 21 in a portion near the nip entrance, the temperature sensor 27 that accurately detects the temperature at the portion near the nip entrance enables ensuring the fixing property of the image and effectively preventing the occurrence of fixing offset (i.e., a state in which the toner image cannot be sufficiently heated).

Figure 18:
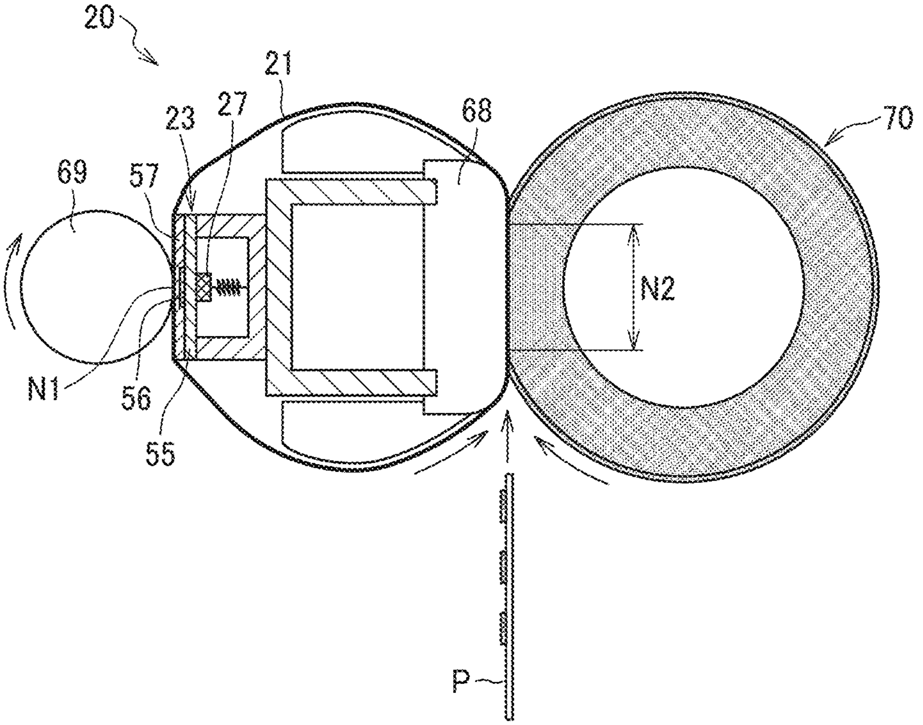
FIG. 18 is a diagram illustrating a configuration of a fixing device according to an embodiment of the present disclosure.

Next, the fixing device 20 in the embodiment illustrated in FIG. 18 has a heating nip N1 in which the heater 23 heats the fixing belt 21 and a fixing nip N2 through which the sheet P passes, and the heating nip N1 and the fixing nip N2 are formed at different positions. Specifically, the fixing device 20 in the present embodiment includes a nip formation pad 68 inside the loop of the fixing belt 21 in addition to the heater 23. A pressure roller 69 presses the heater 23 via the fixing belt 21 to form the heating nip N1, and a pressure roller 70 presses the nip formation pad 68 to form the fixing nip N2. In the above-described fixing device 20, the heater 23 heats the fixing belt 21 in the heating nip N1, and the fixing belt 21 applies the heat to the sheet P in the fixing nip N2 to fix the unfixed image onto the sheet P.

Figure 19:
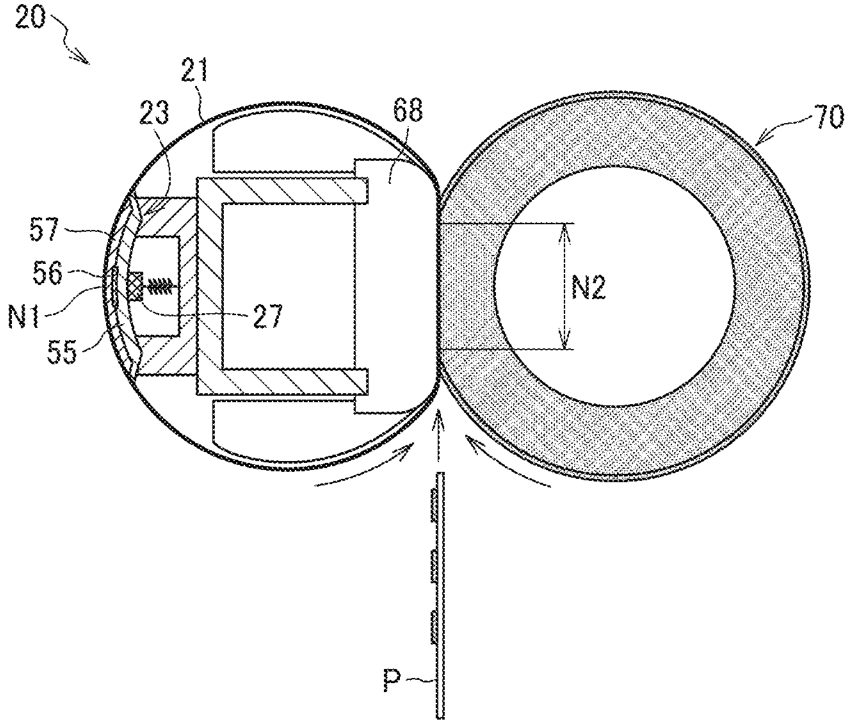
FIG. 19 is a diagram illustrating a configuration of a fixing device according to an embodiment of the present disclosure.

Next, the fixing device 20 illustrated in FIG. 19 omits the above-described pressure roller 69 adjacent to the heater 23 from the fixing device 20 illustrated in FIG. 18 and includes the heater 23 formed to be arc having a curvature of the fixing belt 21. The other configuration is the same as the configuration illustrated in FIG. 18. In this case, the arc shaped heater 23 surely maintains a length of the contact between the fixing belt 21 and the heater 23 in a belt rotation direction to efficiently heat the fixing belt 21.

Figure 20:
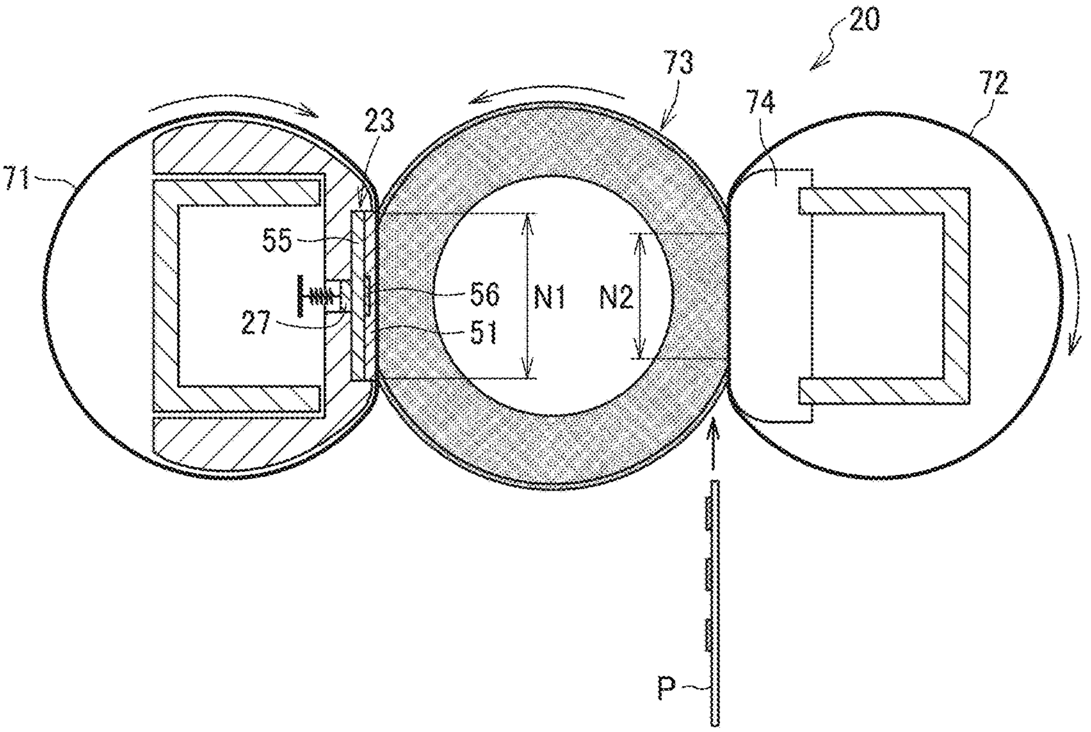
FIG. 20 is a diagram illustrating a configuration of a fixing device according to an embodiment of the present disclosure.

Subsequently, the fixing device 20 illustrated in FIG. 20 is an example in which a roller 73 as another rotator is arranged between belts 71 and 72 as a pair of rotators. In this example, the fixing device 20 includes the heater 23 disposed inside the loop of the belt 71 on the left side in FIG. 20 and the nip formation pad 74 disposed inside the loop of the belt 72 on the right side. The heater 23 is in contact with the roller 73 via the left belt 71, and the nip formation pad 74 is in contact with the roller 73 via the right belt 72, thereby forming the heating nip N1 and the fixing nip N2. In this case, the heater 23 heats the roller 73 via the belt 71 on the left side.

Figure 21:
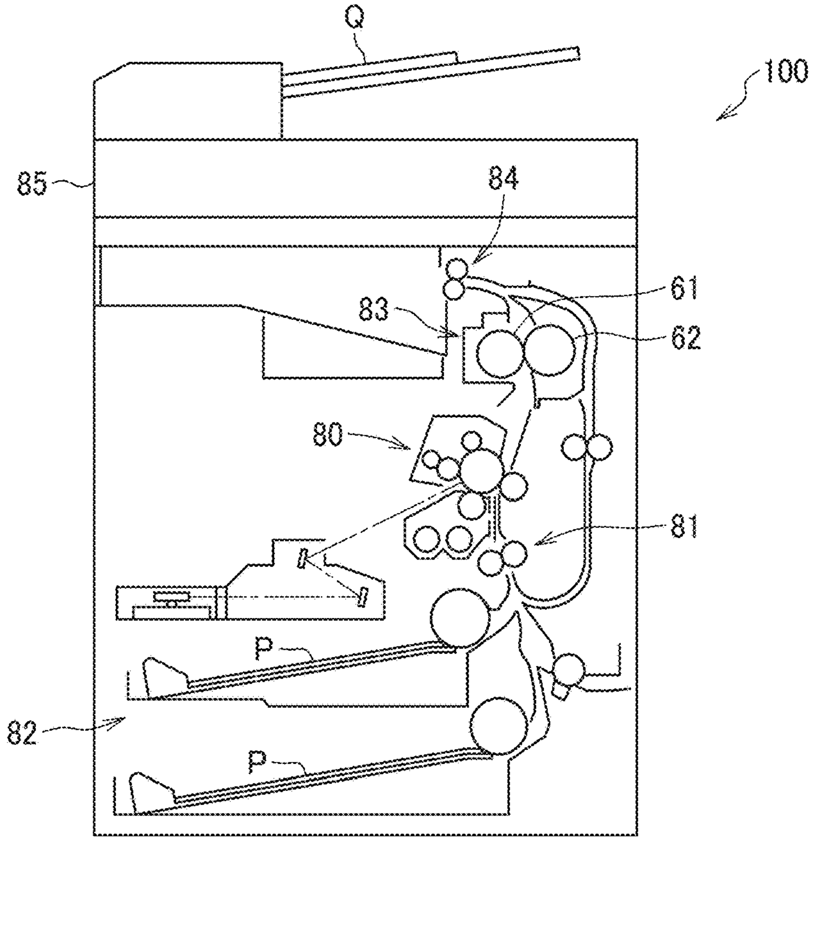
FIG. 21 is a diagram illustrating a configuration of an image forming apparatus according to an embodiment of the present disclosure.

Further, an image forming apparatus according to an embodiment of the present disclosure is not limited to the image forming apparatus illustrated in FIG. 1, and may be, for example, an image forming apparatus having a configuration as illustrated in FIG. 21. The following describes the image forming apparatus according to an embodiment of the present disclosure.

The image forming apparatus 100 illustrated in FIG. 21 includes an image forming device 80 including a photoconductor drum and the like, a sheet conveyer including a timing roller pair 81 and the like, a sheet feeder 82, a fixing device 83, a sheet ejection device 84, and a reading device 85. The sheet feeder 82 includes a plurality of sheet feeding trays, and the sheet feeding trays stores sheets of different sizes, respectively.

The reading device 85 reads an image of a document Q. The reading device 85 generates image data from the read image. The sheet feeder 82 stores the plurality of sheets P and feeds the sheet P to the conveyance path. The timing roller pair 81 conveys the sheet P on the conveyance path to the image forming device 80.

The image forming device 80 forms a toner image on the sheet P. Specifically, the image forming device 80 includes the photoconductor drum, a charging roller, the exposure device, the developing device, a supply device, a transfer roller, the cleaning device, and a discharger. The fixing device 83 heats and presses the toner image to fix the toner image on the sheet P. Conveyance rollers convey the sheet P on which the toner image has been fixed to the sheet ejection device 84. The sheet ejection device 84 ejects the sheet P to the outside of the image forming apparatus 100.

Next, a fixing device 83 according to the present embodiment is described with reference to FIG. 22. In the configuration illustrated in FIG. 22, components common to those of the fixing device 20 of the above-described embodiment illustrated in FIG. 2 are denoted by the same reference numerals, and a description thereof will be omitted.

Figure 22:
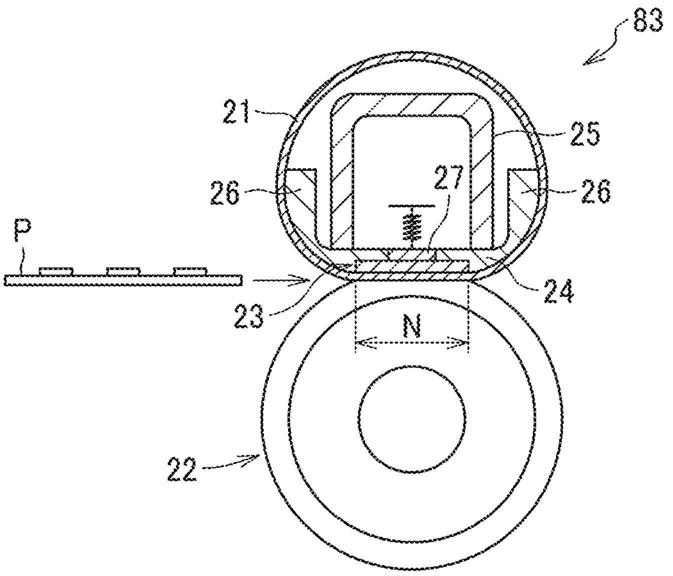
FIG. 22 is a diagram illustrating a configuration of a fixing device illustrated in FIG. 21.

As illustrated in FIG. 22, the fixing device 83 includes the fixing belt 21, the pressure roller 22, the heater 23, the heater holder 24, the stay 25, and the temperature sensors 27.

The fixing nip N is formed between the fixing belt 21 and the pressure roller 22. The nip width of the fixing nip N is 10 mm, and the linear velocity of the fixing device 83 is 240 mm/s.

The fixing belt 21 includes a polyimide base and the release layer and does not include the elastic layer. The release layer is made of a heat-resistant film material made of, for example, fluororesin. The outer loop diameter of the fixing belt 21 is about 24 mm.

The pressure roller 22 includes the core, the elastic layer, and the release layer. The pressure roller 22 has an outer diameter of 24 to 30 mm, and the elastic layer has a thickness of 3 to 4 mm.

The heater 23 includes the base, a thermal insulation layer, a conductor layer including the resistive heat generator and the like, and the insulation layer, and is formed to have a thickness of 1 mm as a whole. The width of the heater 23 in the sheet conveyance direction is, for example, 13 mm.

Figure 23:
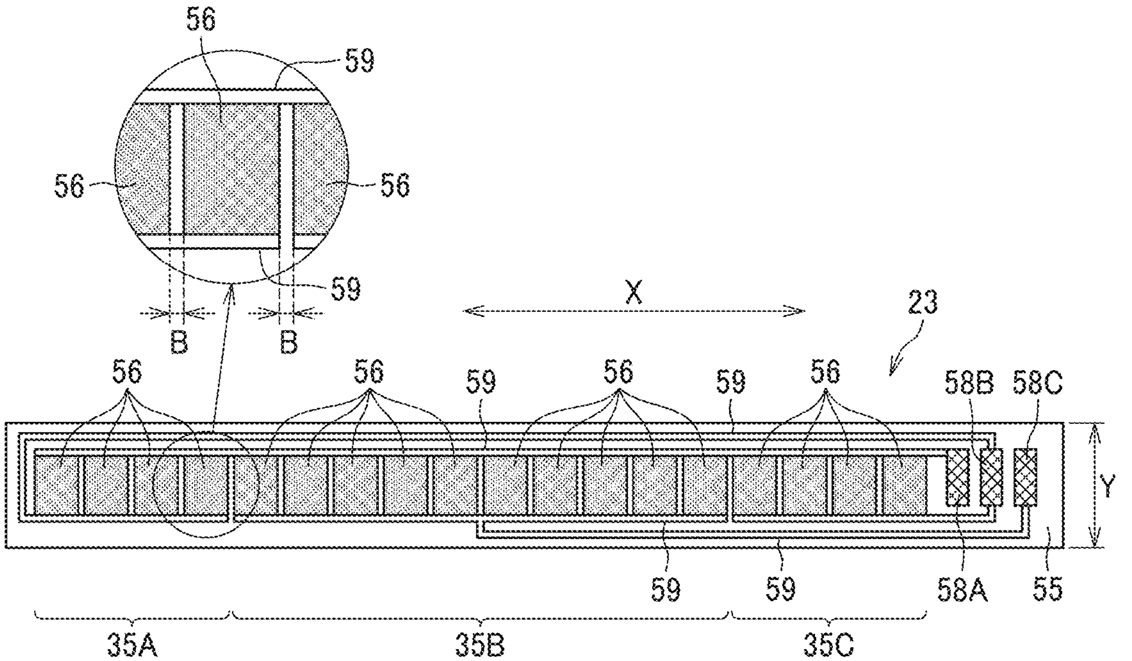
FIG. 23 is a plan view of a heater illustrated in FIG. 22.

As illustrated in FIG. 23, the conductor layer of the heater 23 includes the plurality of resistive heat generators 56, the power supply lines 59, and electrodes 58A to 58C. The plurality of resistive heat generators 56 are arranged at intervals in the longitudinal direction of the heater 23 (i.e., the direction indicated by arrow X). The heater 23 has a gap between the neighboring resistive heat generators 56. Hereinafter, the gap is referred to as a separation area B. As illustrated in an enlarged view of FIG. 23, the separation area B is formed between neighboring resistive heat generators of the plurality of resistive heat generators 56. The enlarged view of FIG. 22 illustrates two separation areas B, but the separation area B is formed between the neighboring resistive heat generators of all the plurality of resistive heat generators 56. In FIG. 23, a direction indicated by arrow Y is a direction intersecting or orthogonal to the longitudinal direction X of the heater 23, which is referred to as a longitudinal intersecting direction. The longitudinal intersecting direction is different from a thickness direction of the base 55. In addition, the direction indicated by arrow Y is the same direction as a direction intersecting an arrangement direction of the plurality of resistive heat generators 56, a short-side direction of the heater 23 along a surface of the base 55 on which the resistive heat generators 56 are disposed, and the sheet conveyance direction of the sheet passing through fixing device.

The heater 23 includes a central heat generation portion 35B and end heat generation portions 35A and 35C at both sides of the central heat generation portion 35B. The central heat generation portion 35B and the end heat generation portions 35A and 35C are configured by the plurality of resistive heat generators 56. The end heat generation portions 35A and 35C can generate heat separately from the central heat generation portion 35B. For example, applying a voltage between a left electrode 58A and a central electrode 58B in FIG. 23 among three electrodes 58A to 58C causes the end heat generation portions 35A and 35C adjacent to both sides of the central heat generation portion 35B to generate heat. Applying the voltage between the left electrode 58A and a right electrode 58C causes the central heat generation portion 35B to generate heat. When the fixing device fixes the image onto a small sheet, the central heat generation portion 35B generates heat. When the fixing device fixes the image onto a large sheet, all the heat generation portions 35A to 35C generate heat. As a result, the heater in the fixing device can generate heat in accordance with the size of the sheet.

Figure 24:
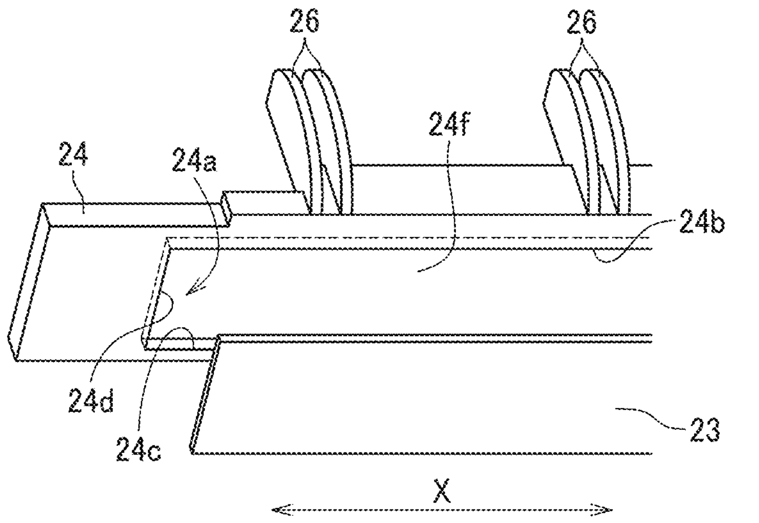
FIG. 24 is a perspective view of the heater illustrated in FIG. 22 and a heater holder.

As illustrated in FIG. 24, the heater holder 24 according to the present embodiment includes a recessed portion 24*a* to receive and hold the heater 23. The recessed portion 24*a* is formed on the side of the heater holder 24 facing the heater 23. The recessed portion 24*a* has a bottom 24*f* formed in a rectangular shape substantially the same size as the heater 23, and four side walls 24*b*, 24*c*, 24*d*, and 24*e* disposed on four sides of the bottom 24*f*, respectively. In FIG. 24, the right side wall 24*e* is omitted. The recessed portion 24*a* may have an opening that opens toward one end in the longitudinal direction of the heater 23. The opening is configured by removing one of a pair of a left side wall 24*d* and a right side wall 24*e* that intersect the longitudinal direction X of the heater 23 (i.e., the arrangement direction of the resistive heat generators 56).

Figure 25:
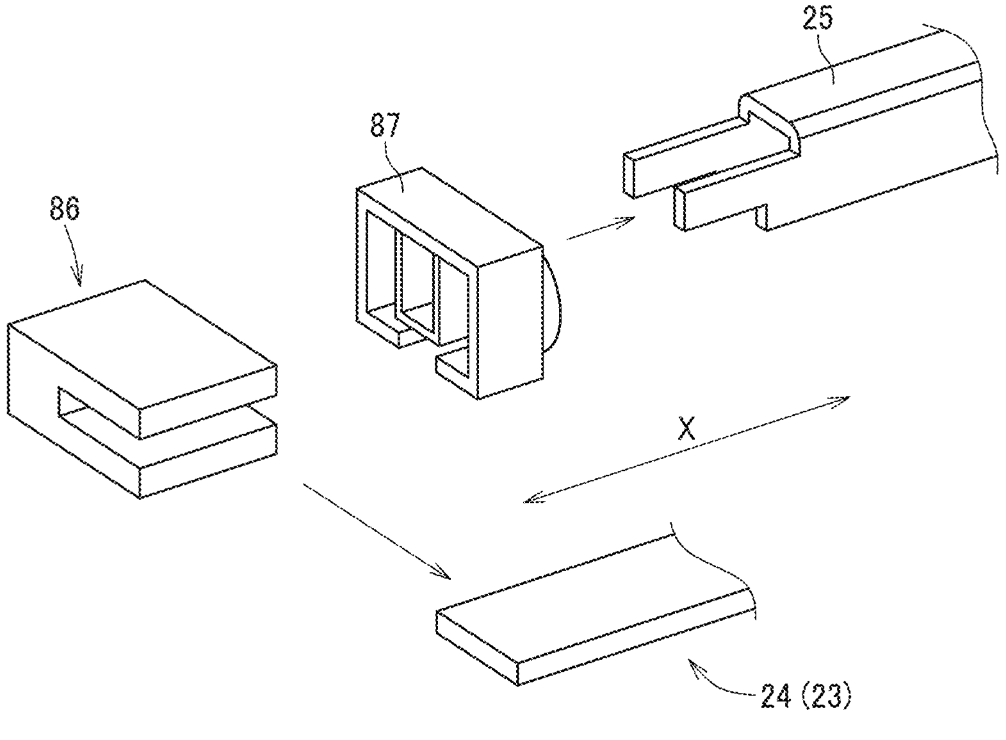
FIG. 25 is a diagram illustrating a method of attaching a connector to the heater illustrated in FIG. 22.

As illustrated in FIG. 25, a connector 86 holds the heater 23 and the heater holder 24 according to the present embodiment. The connector 86 includes a housing made of resin such as LCP and a plurality of contact terminals fixed to the inner surface of the housing.

To attach to the heater 23 and the heater holder 24, the connector 86 is moved in the direction intersecting the longitudinal direction X that is the arrangement direction of the resistive heat generators 56 (see a direction indicated by arrow extending from the connector 86 in FIG. 25). The connector 86 is attached to one end of the heater 23 and one end of the heater holder 24 in the longitudinal direction X of the heater 23 that is the arrangement direction of the resistive heat generators 56. The one end of the heater 23 and one end of the heater holder 24 are farther from a portion in which the pressure roller 22 receives a driving force from a drive motor than the other end of the heater 23 and the other end of the heater holder 24, respectively. The connector 86 and the heater holder 24 may have a convex portion and a recessed portion to attach the connector 86 to the heater holder 24. The convex portion disposed on one of the connector 86 and the heater holder 24 is engaged with the recessed portion disposed on the other and relatively move in the recessed portions to attach the connector 86 to the heater holder 24.

After the connector 86 is attached to the heater 23 and the heater holder 24, the heater 23 and the heater holder 24 are sandwiched from the front side and the back side and held by the connector 86. In this state, the contact terminals contact and press against the electrodes of the heater 23, respectively, and the resistive heat generators 56 are electrically coupled to the power supply disposed in the image forming apparatus via the connector 86. As a result, the power supply can supply electric power to the resistive heat generators 56.

A flange 87 illustrated in FIG. 25 is a belt holder. Two flanges 87 are disposed outside both ends of the fixing belt 21 in the longitudinal direction, and inner sides of the flanges 87 are in contact with both ends of the fixing belt 21, respectively to hold the fixing belt 21. The flanges 87 are inserted into both ends of the stay 25 and are fixed to a pair of side plates that are frame members of the fixing device.

Figure 26:
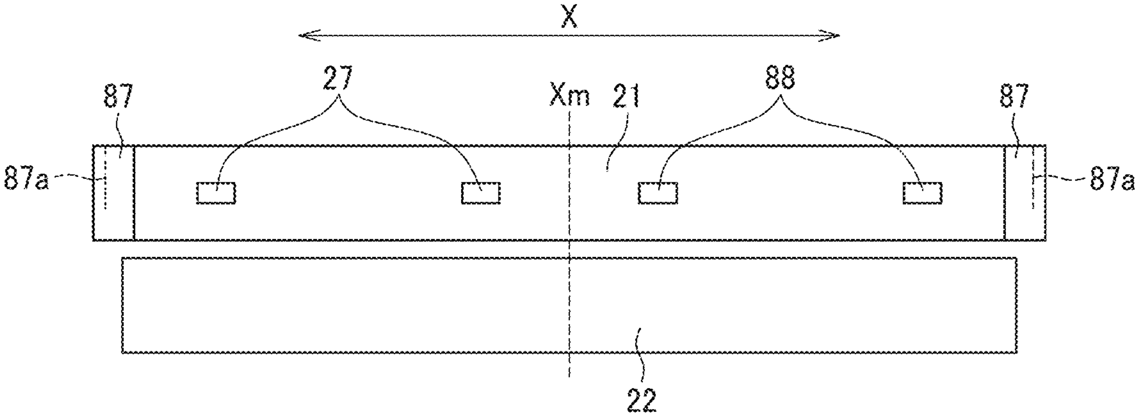
FIG. 26 is a diagram illustrating the arrangement of temperature sensors and thermostats included in the fixing device illustrated in FIG. 21.

FIG. 26 is a diagram illustrating an arrangement of temperature sensors 27 and thermostats 88 included in the fixing device according to the present embodiment. Each of the thermostats cuts off a current flowing through the resistive heat generators under a certain condition.

As illustrated in FIG. 26, the temperature sensors 27 according to the present embodiment are disposed to face the inner circumferential surfaces at positions closer to the center Xm and one end of the fixing belt 21 in the longitudinal direction (arrow X direction) of the fixing belt 21. One of the temperature sensors 27 is disposed at a position corresponding to the separation area B (see FIG. 23) between the resistive heat generators of the heater 23.

In addition, one of the thermostats 88 is disposed to face the inner circumferential surface of the fixing belt 21 near the center Xm of the fixing belt 21, and the other one of the thermostats 88 is disposed to face the inner circumferential surface of the fixing belt 21 near the end of the fixing belt 21. Each thermostat 88 detects the temperature of the inner circumferential surface of the fixing belt 21 or the ambient temperature in the vicinity of the inner circumferential surface of the fixing belt 21. The thermostat 88 cuts off the current flowing to the heater 23 in response to detecting the temperature that exceeds a preset threshold value.

Figure 27:
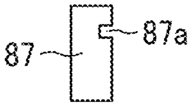
FIG. 27 is a diagram illustrating a groove in a flange illustrated in FIG. 25.

As illustrated in FIGS. 26 and 27, flanges 87 to hold both ends of the fixing belt 21 each have a slide groove 87*a*. The slide groove 87*a* extends in a direction in which the fixing belt 21 moves toward and away from the pressure roller 22. An engaging portion of a housing of the fixing device is engaged with the slide groove 87*a*. The relative movement of the engaging portion in the slide groove 87*a* enables the fixing belt 21 to move toward and away from the pressure roller 22.

The present disclosure is also applicable to the fixing device having the following configuration.

Figure 28:
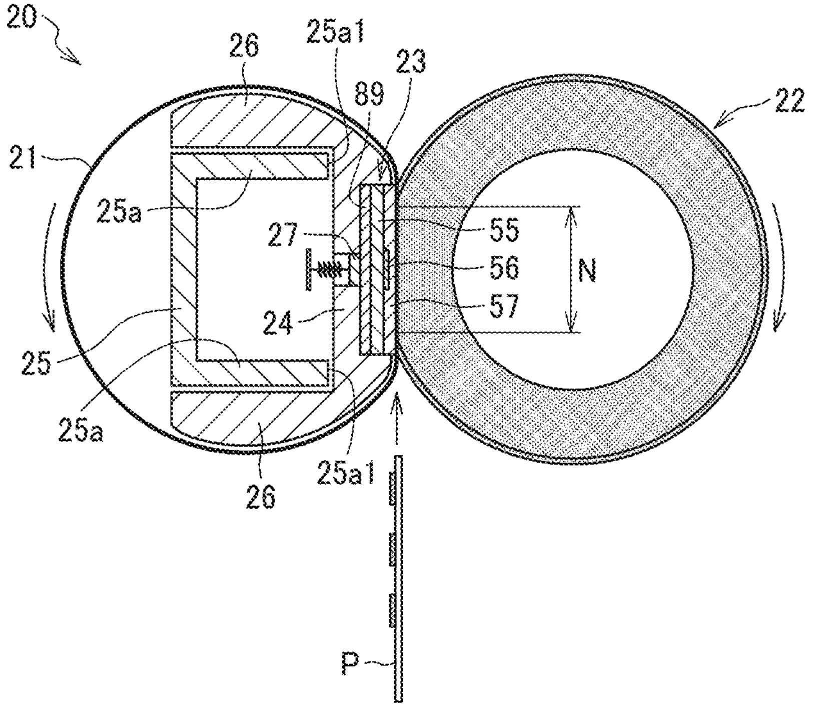
FIG. 28 is a diagram illustrating the configuration of a fixing device according to an embodiment of the present disclosure.

FIG. 28 is a schematic view of a fixing device having a different configuration from the fixing devices described above. The above-described embodiments may be applied to the fixing device.

As illustrated in FIG. 28, the fixing device 20 according to the present embodiment includes a fixing belt 21 as a fixing rotator, a pressure roller 22 as an opposed rotator or a pressure rotator, a heater 23 as a heat source, a heater holder 24 as a heat source holder, a stay 25 as a support, a temperature sensor 27 that is the thermistor as a temperature detector, and a first high thermal conduction member 89. In other words, the fixing device 20 according to the present embodiment has basically the same configuration as the fixing device illustrated in FIG. 2 except that the fixing device 20 includes the first high thermal conduction member 89. In this case, the temperature sensor 27 contacts the first high thermal conduction member 89 in contact with the heater 23 to detect the temperature of the heater 23 via the first high thermal conduction member 89. The fixing belt 21 is an endless belt. The pressure roller 22 is in contact with the outer circumferential surface of the fixing belt 21 to form the fixing nip N between the pressure roller 22 and the fixing belt 21. The heater 23 heats the fixing belt 21. The heater holder 24 holds the heater 23. The stay 25 supports the heater holder 24. The direction orthogonal to the surface of the paper on which FIG. 28 is drawn is the longitudinal direction of the fixing belt 21, the pressure roller 22, the heater 23, the heater holder 24, the stay 25, and the first high thermal conduction member 89, and this direction is hereinafter simply referred to as the longitudinal direction. The longitudinal direction is also the width direction of the conveyed sheet, the belt width direction of the fixing belt 21, and the axial direction of the pressure roller 22.

The heater 23 in the present embodiment includes a plurality of resistive heat generators 56 arranged at intervals in the longitudinal direction of the heater 23, which is the same as the heater illustrated in FIG. 23. In the heater 23 including the plurality of resistive heat generators 56 arranged at intervals, the temperature of the heater 23 in the separation area B corresponding to the interval between the resistive heat generators 56 tends to be lower than the temperature of the heater 23 in a portion entirely occupied by the resistive heat generator 56. For this reason, the temperature of the fixing belt 21 corresponding to the separation area also becomes low, which may cause an uneven temperature distribution of the fixing belt 21 in the longitudinal direction.

To prevent the above-described temperature drop in the separation area B and reduce the temperature unevenness in the longitudinal direction of the fixing belt 21, the fixing device in the present embodiment includes the first high thermal conduction member 89. Next, a detailed description is given of the first high thermal conduction member 89.

As illustrated in FIG. 28, the first high thermal conduction member 89 is disposed between the heater 23 and the stay 25 in the lateral direction of FIG. 24 and is in particular sandwiched between the heater 23 and the heater holder 24. One side of the first high thermal conduction member 89 is brought into contact with the back surface of the base 55 of the heater 23, and the other side (i.e., the side opposite to the one side) of the first high thermal conduction member 89 is brought into contact with the heater holder 24.

The stay 25 has two vertical portions 25*a* extending in a thickness direction of the heater 23 and each having a contact surface 25*a*1 in contact with the heater holder 24 to support the heater holder 24, the first high thermal conduction member 89, and the heater 23. In the direction intersecting the longitudinal direction that is the vertical direction in FIG. 28, the contact surfaces 25*a*1 are outside the resistive heat generators 56. The above-described structure prevents heat transfer from the heater 23 to the stay 25 and enables the heater 23 to effectively heat the fixing belt 21.

Figure 29:
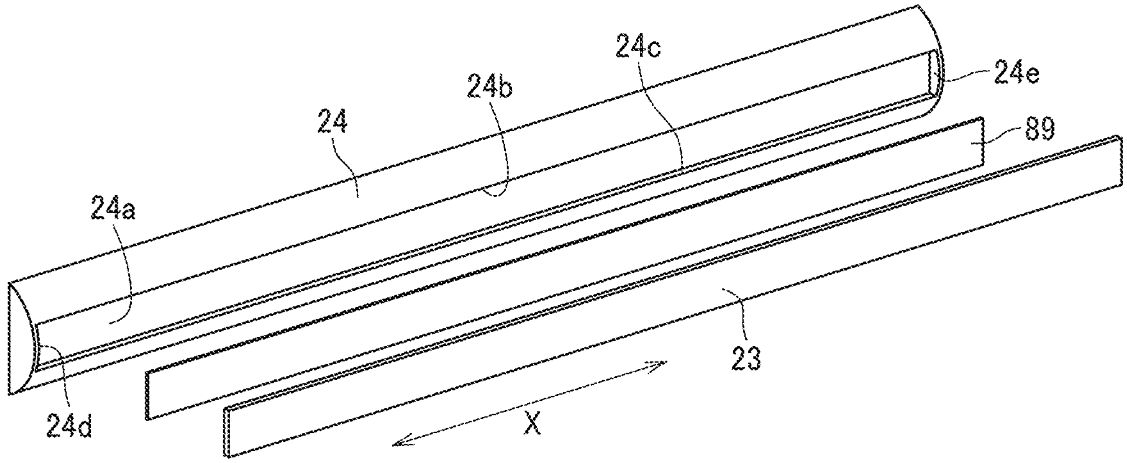
FIG. 29 is a perspective view of a heater, a first high thermal conduction member, and a heater holder that are illustrated in FIG. 28.

As illustrated in FIG. 29, the first high thermal conduction member 89 is a plate having a certain thickness such as 0 3 mm and having, for example, a length of 222 mm in the longitudinal direction, and a width of 10 mm in the direction intersecting the longitudinal direction. In the present embodiment, the first high thermal conduction member 89 is made of a single plate but may be made of a plurality of members. In FIG. 29, the guide 26 illustrated in FIG. 28 is omitted.

The first high thermal conduction member 89 is fitted into the recessed portion 24*a* of the heater holder 24, and the heater 23 is mounted thereon. Thus, the first high thermal conduction member 89 is sandwiched and held between the heater holder 24 and the heater 23. In the present embodiment, the length of the first high thermal conduction member 89 in the longitudinal direction is substantially the same as the length of the heater 23 in the longitudinal direction. Both side walls 24*d* and 24*e* extending in a direction intersecting the longitudinal direction of the recessed portion 24*a* restrict movement of the heater 23 and movement of the first high thermal conduction member 89 in the longitudinal direction and work as longitudinal direction regulators. Reducing a positional shift of the first high thermal conduction member 89 in the longitudinal direction in the fixing device increases the thermal conductivity efficiency with respect to a target range in the longitudinal direction. Both side walls 24*b* and 24*c* extending in the longitudinal direction of the recessed portion 24*a* restrict movement of the heater 23 and movement of the first high thermal conduction member 89 in the direction intersecting the longitudinal direction and work as direction-intersecting-arrangement-direction regulators.

Figure 30:
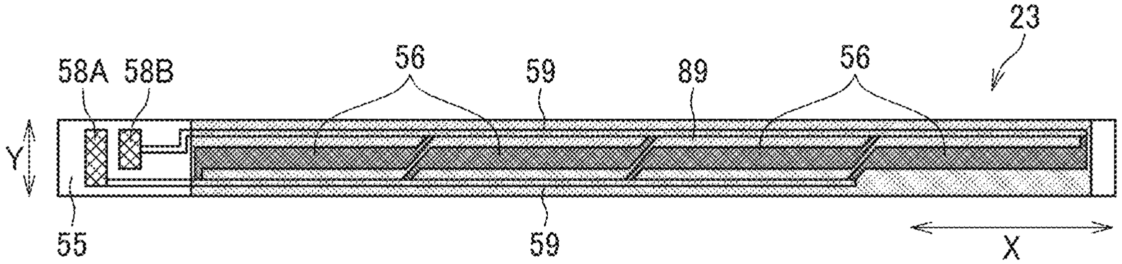
FIG. 30 is a plan view of the heater, which illustrates an example of the arrangement of the first high thermal conduction member.
Figure 31:
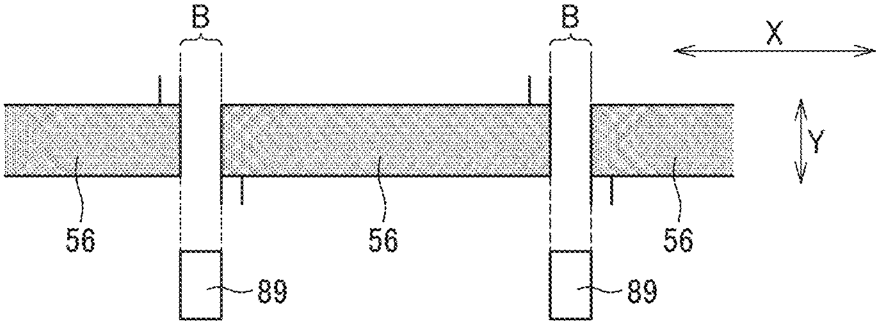
FIG. 31 is a plan view of the heater, which illustrate another example of the arrangement of the first high thermal conduction member.
Figure 32:
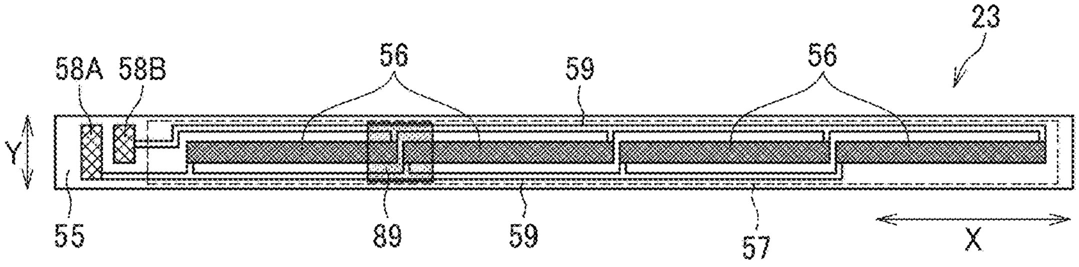
FIG. 32 is a plan view of the heater, which illustrate still another example of the arrangement of the first high thermal conduction member.

The range in which the first high thermal conduction member 89 is disposed in the longitudinal direction indicated by arrow X is not limited to the range illustrated in FIG. 29. For example, as illustrated in FIG. 30, the first high thermal conduction member 89 may be disposed in only a longitudinal range in which the resistive heat generators 56 are disposed (see a hatched portion in FIG. 30). As illustrated in FIG. 31, the first high thermal conduction members 89 may be disposed in only the entire separation areas at positions corresponding to the separation area B in the longitudinal direction indicated by arrow X. In FIG. 31, for the sake of convenience, the resistive heat generators 56 and the first high thermal conduction members 89 are shifted in the vertical direction of FIG. 31 but are disposed at substantially the same position in the direction intersecting the longitudinal direction indicated by arrow Y. In addition, the first high thermal conduction member 89 may be disposed over a part of the resistive heat generator 56 in the longitudinal intersecting direction indicated by arrow Y, or as in the example illustrated in FIG. 32, may be disposed so as to cover all the resistive heat generators 56 in the longitudinal intersecting direction indicated by arrow Y. As illustrated in FIG. 32, the first high thermal conduction member 89 may be disposed across the resistive heat generators 56 on both sides between which the separation area B is sandwiched, in addition to at a position corresponding to the separation area B between the resistive heat generators 56. The phrase "the first high thermal conduction member 89 is disposed across the resistive heat generators 56 on both sides" means that the first high thermal conduction member 89 and the resistive heat generators 56 on both sides at least partially overlap in the longitudinal direction. The first high thermal conduction member 89 may be disposed to face all separation areas B in the heater 23, one separation area B as illustrated in FIG. 32, or some of separation areas B. The phrase "the first high thermal conduction member 89 is disposed to face all separation areas B" means that at least a part of the separation area B and the first high thermal conduction member 89 overlap in the longitudinal direction.

Due to the pressing force of the pressure roller 22, the first high thermal conduction member 89 is sandwiched between the heater 23 and the heater holder 24 and is brought into close contact with the heater 23 and the heater holder 24. Bringing the first high thermal conduction member 89 into contact with the heaters 23 increases the heat conduction efficiency in the longitudinal direction of the heaters 23. The first high thermal conduction member 89 facing the separation area B of the heater 23 increases the heat conduction efficiency of the separation area B in the longitudinal direction, transmits heat to the separation area B, and raise the temperature of the separation area B. Thus, the first high thermal conduction member 89 reduces temperature unevenness of the heater 23 in the longitudinal direction and the temperature unevenness of the fixing belt 21 in the longitudinal direction. As a result, the above-described structure prevents fixing unevenness and gloss unevenness in the image fixed on the sheet. Since the heater 23 does not need to generate additional heat to secure sufficient fixing performance in the part of the heater 23 facing the separation area B, energy consumption of the fixing device can be saved. In particular, the first high thermal conduction member 89 disposed over the entire area in which the resistive heat generators 56 are arranged in the longitudinal direction increases the heat transfer efficiency of the heater 23 over the entire area of a main heating region of the heater 23 (i.e., an area facing an image formation area of the sheet passing through the fixing device) and reduces the temperature unevenness of the heater 23 and the temperature unevenness of the fixing belt 21 in the longitudinal direction.

In addition, the combination of the first high thermal conduction member 89 and the resistive heat generator 56 having a positive temperature coefficient (PTC) characteristic effectively prevents the overheating of a non-sheet passing area (that is the region of the fixing belt outside the small sheet) when small sheets pass through the fixing device. The PTC characteristic is a characteristic in which the resistance value increases as the temperature increases, for example, a heater output decreases under a constant voltage. The resistive heat generator 56 having the PTC characteristic effectively reduces the amount of heat generated by the resistive heat generator 56 in the non-sheet passing area, and the first high thermal conduction member 89 effectively transfers heat from the non-sheet passing area in which the temperature rises to a sheet passing area that is a region of the fixing belt contacting the sheet. As a result, the overheating of the non-sheet passing area is effectively prevented.

Figure 33:
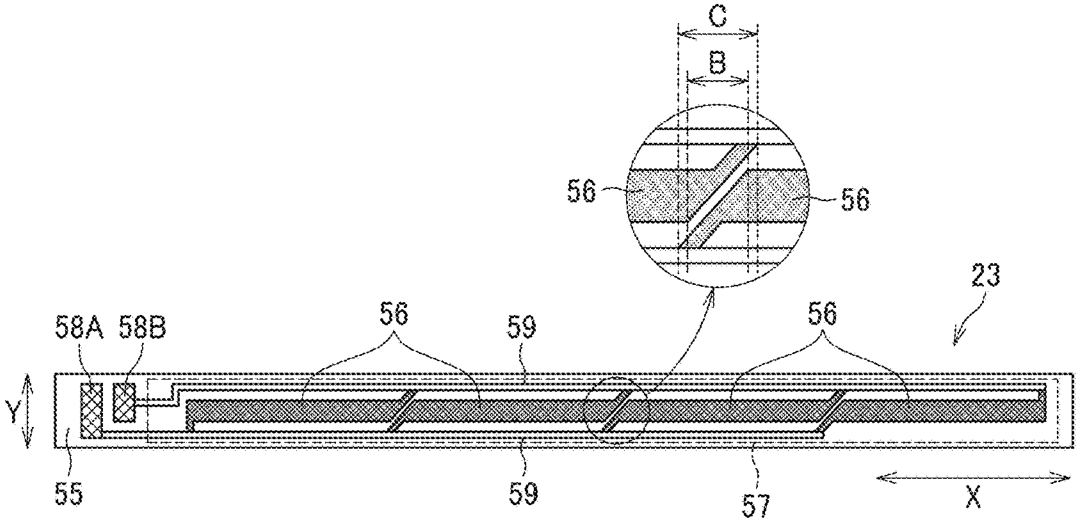
FIG. 33 is a plan view of the heater, which illustrates an enlarged separation region.

The first high thermal conduction member 89 may be disposed opposite an area around the separation area B because the small heat generation amount in the separation area B decreases the temperature of the heater 23 in the area around the separation area B. For example, the first high thermal conduction member 89 facing the enlarged separation area C that includes the separation area and an area around the separation area B as illustrated in FIG. 33 improves the heat transfer efficiency of the separation area B and the area around the separation area B in the longitudinal direction and effectively reduces the temperature unevenness in the longitudinal direction of the heaters 23. The first high thermal conduction member 89 facing the entire region in which all the resistive heat generators 56 are arranged in the longitudinal direction reduces the temperature unevenness of the heater 23 (and the fixing belt 21) in the longitudinal direction.

Next, another embodiment of the fixing device is described.

Figure 34:
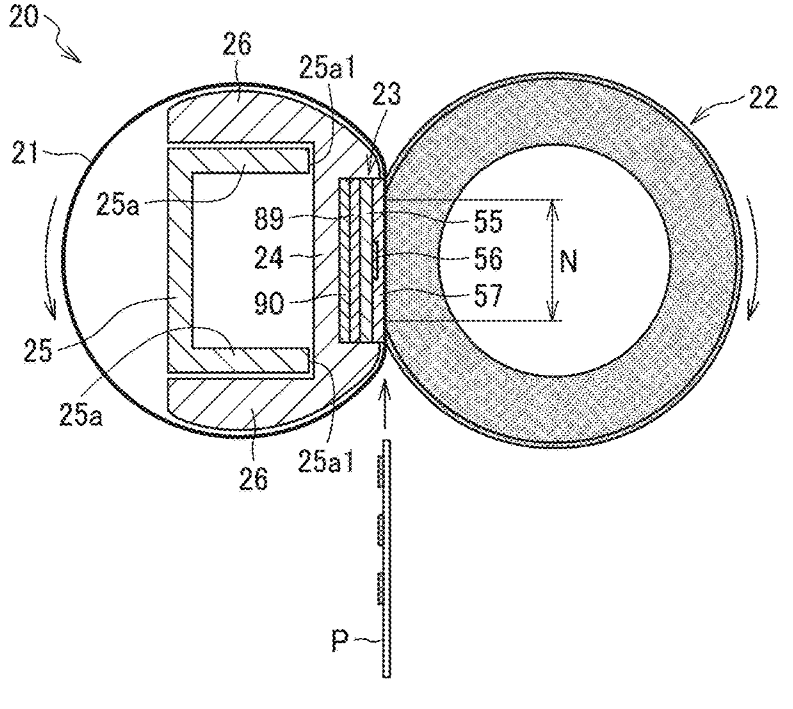
FIG. 34 is a diagram illustrating a configuration of a fixing device according to an embodiment of the present disclosure.

The fixing device 20 illustrated in FIG. 34 includes a second high thermal conduction member 90 between the heater holder 24 and the first high thermal conduction member 89. The second high thermal conduction member 90 is disposed at a position different from the position of the first high thermal conduction member 89 in the lateral direction in FIG. 34 that is a direction in which the heater holder 24, the stay 25, and the first high thermal conduction member 89 are layered. Specifically, the second high thermal conduction member 90 is disposed so as to overlap the first high thermal conduction member 89. The fixing device in the present embodiment includes the temperature sensor 27 (i.e., the thermistor), which is the same as the fixing device illustrated in FIG. 28. FIG. 34 illustrates a cross section in which the temperature sensor 27 is not disposed.

The second high thermal conduction member 90 is made of a material having thermal conductivity higher than the thermal conductivity of the base 55, for example, graphene or graphite. in the present embodiment, the second high thermal conduction member 90 is made of a graphite sheet having a thickness of 1 mm. Alternatively, the second high thermal conduction member 90 may be a plate made of aluminum, copper, silver, or the like.

Figure 35:
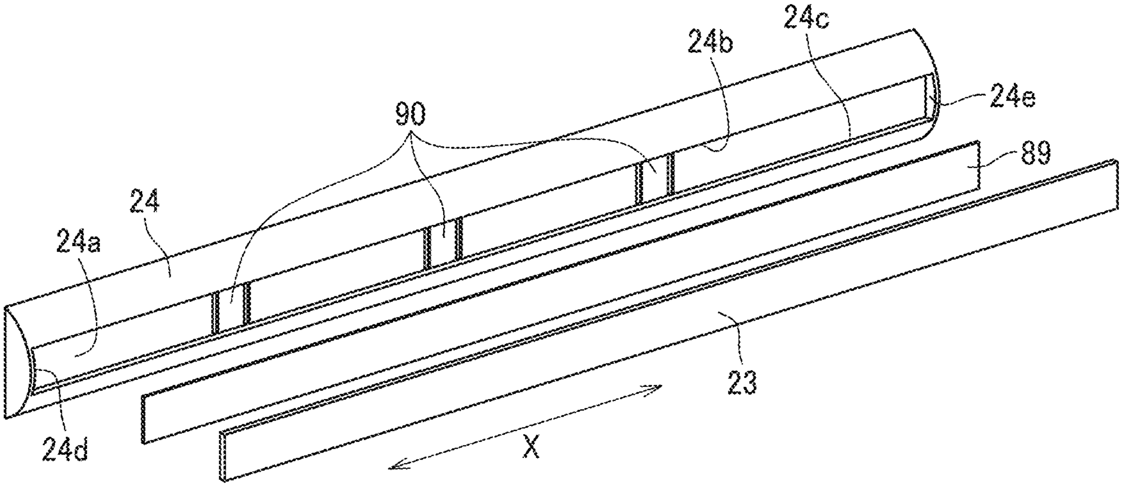
FIG. 35 is a perspective view of a heater, a first high thermal conduction member, a second high thermal conduction member, and a heater holder that are illustrated in FIG. 34.

As illustrated in FIG. 35, a plurality of second high thermal conduction members 90 are arranged on the recessed portion **24*a* of the heater holder 24 at intervals in the longitudinal direction. The recessed portion 24*a* of the heater holder 24 has a plurality of holes in which the second high thermal conduction members 90 are disposed. Clearances are formed between the heater holder 24 and both sides of the second high thermal conduction member 90 in the longitudinal direction. The clearance prevents heat transfer from the second high thermal conduction member 90 to the heater holder 24, and the heater 23 efficiently heats the fixing belt 21. In FIG. 35, the guide 26 illustrated in FIG. 28** is omitted.

Figure 36:
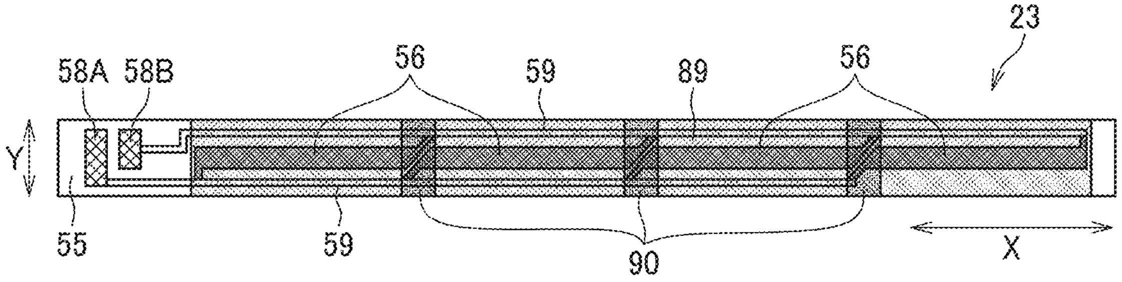
FIG. 36 is a plan view of the heater, which illustrates an example of the arrangement of the first high thermal conduction member and the second high thermal conduction member.

As illustrated in FIG. 36, each of the second high thermal conduction members 90 (see the hatched portions) is disposed at a position corresponding to the separation area B in the longitudinal direction indicated by arrow X and faces at least a part of each of the neighboring resistive heat generators 56 in the longitudinal direction. In particular, each of the second high thermal conduction members 90 in the present embodiment faces the entire separation area B. FIG. 36 (and FIG. 38 described later) illustrate a case where the first high thermal conduction member 89 is disposed over the entire region in the longitudinal direction in which all the resistive heat generators 56 are disposed, but the disposition range of the first high thermal conduction member 89 is not limited thereto.

Figure 37:
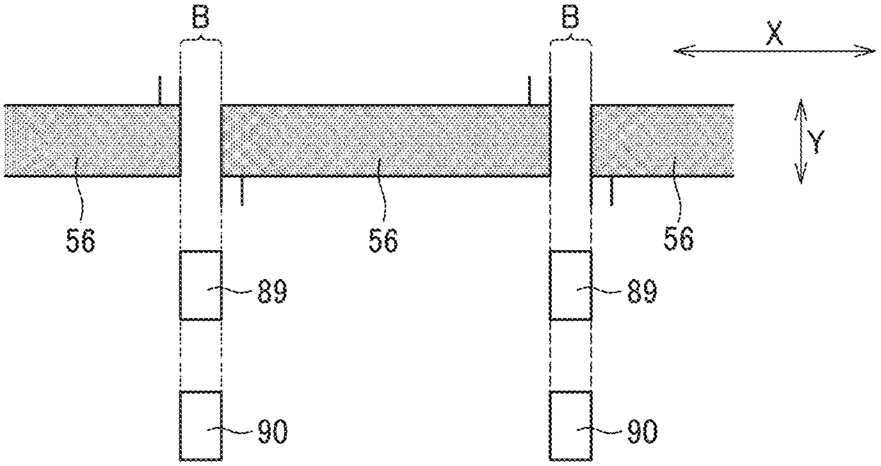
FIG. 37 is a plan view of the heater, which illustrates another example of the arrangement of the first high thermal conduction member and the second high thermal conduction member.

The fixing device according to the present embodiment includes the second high thermal conduction member 90 disposed at a position corresponding to the separation area B in the longitudinal direction and the position at which at least a part of each of the neighboring resistive heat generators 56 faces the second high thermal conduction member 90 in addition to the first high thermal conduction member 89. The above-described structure further improves the heat transfer efficiency in the separation area B in the longitudinal direction and more efficiently reduces the temperature unevenness of the heater 23 in the longitudinal direction. As illustrated in FIG. 37, the first high thermal conduction members 89 and the second high thermal conduction member 90 may be disposed in only the entire separation areas at positions corresponding to the separation area B. The above-described structure improves in particular the heat transfer efficiency of the part of the heater 23 corresponding to the separation area B to be higher than the heat transfer efficiency of the other part of the heater 23. In FIG. 37, for the sake of convenience, the resistive heat generators 56, the first high thermal conduction members 89, and the second high thermal conduction member 90 are shifted in the vertical direction of FIG. 33 but are disposed at substantially the same position in the direction intersecting the longitudinal direction indicated by arrow Y. However, the present disclosure is not limited to the above. The first high thermal conduction member 89 and the second high thermal conduction member 90 may be disposed opposite a part of the resistive heat generators 56 in the direction intersecting the longitudinal direction or may be disposed so as to cover the entire resistive heat generators 56 in the direction intersecting the longitudinal direction.

Both the first high thermal conduction member 89 and the second high thermal conduction member 90 may be made of a graphene sheet. The first high thermal conduction member 89 and the second high thermal conduction member 90 made of the graphene sheet have high thermal conductivity in a predetermined direction along the plane of the graphene, that is, not in the thickness direction but in the longitudinal direction. Accordingly, the above-described structure can effectively reduce the temperature unevenness of the fixing belt 21 in the longitudinal direction and the temperature unevenness of the heater 23 in the longitudinal direction.

Figure 40:
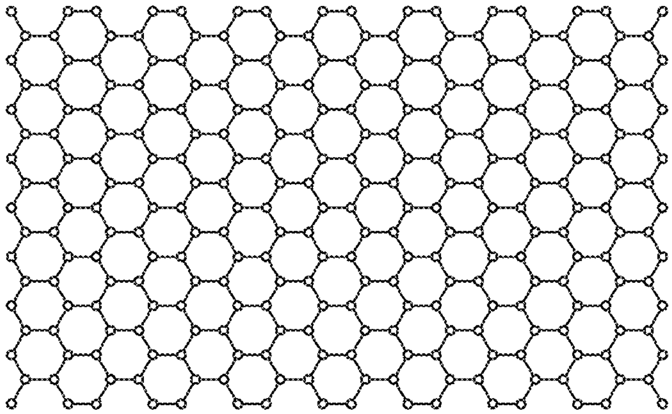
FIG. 40 is a diagram illustrating an atomic crystal structure of graphene.

Graphene is a flaky powder. Graphene has a planar hexagonal lattice structure of carbon atoms, as illustrated in FIG. 40. The graphene sheet is usually a single layer. The graphene sheet may contain impurities in a single layer of carbon, or may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 41:
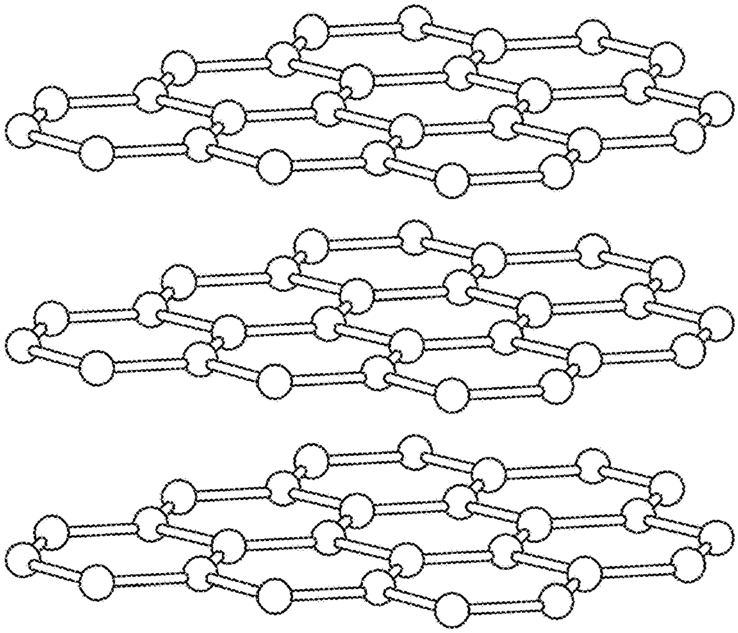
FIG. 41 is a diagram illustrating an atomic crystal structure of graphite.

Graphite obtained by multilayering graphene has a large thermal conduction anisotropy. As illustrated in FIG. 41, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. In other words, the first high thermal conduction member 89 and the second high thermal conduction member 90 that are made of graphite each have the heat transfer efficiency in the longitudinal direction larger than the heat transfer efficiency in the thickness direction of the first high thermal conduction member 89 and the second high thermal conduction member 90 (i.e., the stacking direction of these members), reducing the heat transferred to the heater holder 24. Accordingly, the above-described structure can efficiently decrease the temperature unevenness of the heater 23 in the longitudinal direction and can minimize the heat transferred to the heater holder 24. Since the first high thermal conduction member 89 and the second high thermal conduction member 90 that are made of graphite are not oxidized at about 700 degrees or lower, the first high thermal conduction member 89 and the second high thermal conduction member 90 each have an excellent heat resistance.

The physical properties and dimensions of the graphite sheet may be appropriately changed according to the function necessary for the first high thermal conduction member 89 or the second high thermal conduction member 90. For example, the anisotropy of the thermal conduction can be increased by using high-purity graphite or single-crystal graphite or increasing the thickness of the graphite sheet. Using a thin graphite sheet can reduce the thermal capacity of the fixing device so that the fixing device can perform high speed printing. A width of the first high thermal conduction member 89 or a width of the second high thermal conduction member 90 in the direction intersecting the longitudinal direction may be increased in response to a large width of the fixing nip N or a large width of the heater 23.

From the viewpoint of increasing mechanical strength, the number of layers of the graphite sheet is preferably 11 or more. The graphite sheet may partially include a single layer portion and a multilayer portion.

Figure 38:
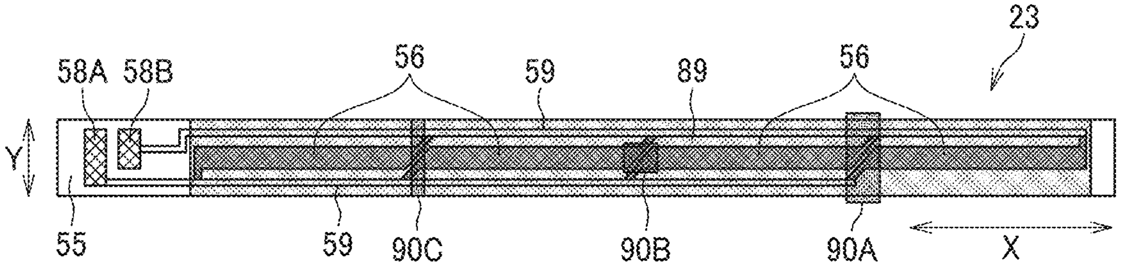
FIG. 38 is a plan view of the heater, which illustrates still another example of the arrangement of the second high thermal conduction member.

As long as the second high thermal conduction member 90 faces a part of each of neighboring resistive heat generators 56 and at least a part of the separation area B (furthermore, the enlarged separation area C), the configuration of the second high thermal conduction member 90 is not limited to the configuration illustrated in FIG. 36. For example, as illustrated in FIG. 38, a second high thermal conduction member 90A is longer than the base 55 in the direction intersecting the longitudinal direction indicated by arrow Y, and both ends of the second high thermal conduction member 90A in the direction intersecting the longitudinal direction are outside the base 55 in FIG. 34. A second high thermal conduction member 90B may face a range in which the resistive heat generators 56 are disposed in the direction intersecting the longitudinal direction. A second high thermal conduction member 90C faces a part of the separation area B and a part of each of neighboring resistive heat generators 56.

Figure 39:
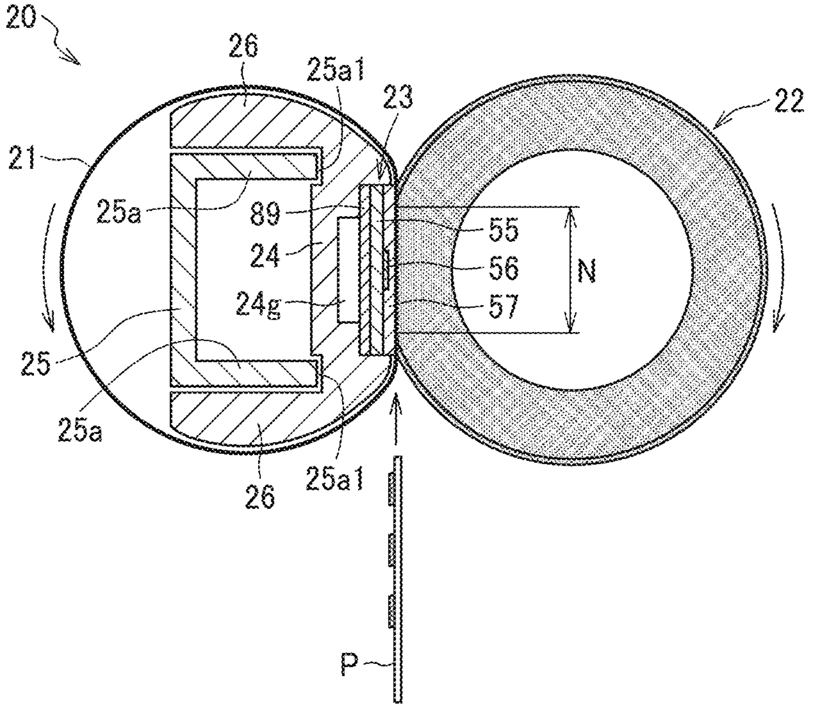
FIG. 39 is a diagram illustrating a configuration of a fixing device according to an embodiment of the present disclosure.

The fixing device according to an embodiment illustrated in FIG. 39 has a gap between the first high thermal conduction member 89 and the heater holder 24 in the thickness direction that is the lateral direction in FIG. 39. In other words, the fixing device has a gap 24*g* serving as a heat insulation layer in a part of a region of the recessed portion 24*a* (see FIG. 35) of the heater holder 24 in which the heater 23, the first high thermal conduction member 89, and the second high thermal conduction member 90 are disposed. The gap 24*g* is in the part of the region of the recessed portion 24*a* in the longitudinal direction, and the second high thermal conduction member 90 is not in the part. The gap 24*g* has a depth deeper than the depth of the recessed portion 24*a* of the heater holder 24. This minimizes the contact area between the heater holder 24 and the first high thermal conduction member 89, whereby it is possible to reduce heat transfer from the first high thermal conduction member 89 to the heater holder 24 and efficiently heat the fixing belt 21 by the heater 23. In the cross section of the fixing device in which the second high thermal conduction member 90 is set, the second high thermal conduction member 90 is in contact with the heater holder 24 as illustrated in FIG. 34 of the above-described embodiment.

The gap 24*g* in the present embodiment in an entire area in which the resistive heat generators 56 are disposed in the direction intersecting the longitudinal direction that is the vertical direction in FIG. 39. The above-described configuration efficiently prevents heat transfer from the first high thermal conduction member 89 to the heater holder 24, and the heater 23 efficiently heats the fixing belt 21. The fixing device may include a thermal insulation layer made of heat insulator having a lower thermal conductivity than the thermal conductivity of the heater holder 24 instead of a space like the gap 24*g* serving as the thermal insulation layer.

In the present embodiment, the second high thermal conduction member 90 is a member different from the first high thermal conduction member 89, but the present embodiment is not limited to this. For example, the first high thermal conduction member 89 may have a thicker portion than the other portion so that the thicker portion faces the separation area B and functions as the second high thermal conduction member 90.

Figure 42:
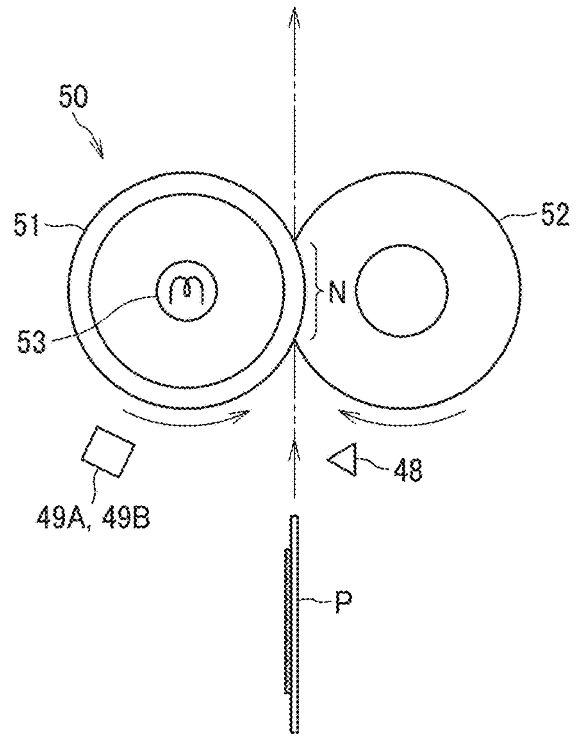
FIG. 42 is a diagram illustrating the configuration of a fixing device according to an embodiment of the present disclosure.

According to an embodiment of the present disclosure, a fixing device 50 may include a halogen heater 53 as illustrated in FIG. 42.

The fixing device 50 illustrated in FIG. 42 includes a fixing roller 51, a pressure roller 52, a halogen heater 53, a central temperature sensor 49A, an end-portion temperature sensor 49B, and a sheet sensor 48.

The halogen heater 53 is a heating body that heats the fixing roller 51, and is disposed inside the fixing roller 51 in a non-contact manner.

Figure 43:
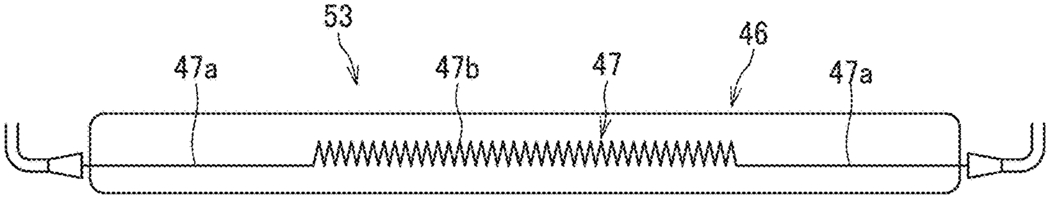
FIG. 43 is a diagram illustrating the configuration of a halogen heater illustrated in FIG. 42.

As illustrated in FIG. 43, the halogen heater 53 is a filament lamp having a glass tube 46 made of quartz glass or the like and a filament 47 stored in the glass tube 46. The filament 47 includes a linear portion 47*a* and a densely wound portion 47*b* densely wound in a coil shape, and the densely wound portion 47*b* is a resistive heat generator that generates heat when power is supplied. The densely wound portion 47*b* serves as a heat generation region. In the example illustrated in FIG. 42, a fixing roller 51 is used instead of the fixing belt in the above embodiment, and the pressure roller 52 comes into contact with the outer peripheral surface of the fixing roller 51 to form a nip N between the fixing roller 51 and the pressure roller 52. The central temperature sensor 49A, the end-portion temperature sensor 49B, and the sheet sensor 48 basically have the same functions as those of the central temperature sensor, the end-portion temperature sensor, and the sheet sensor according to the above embodiment.

Therefore, arranging the central temperature sensor 49A, the end-portion temperature sensor 49B, and the sheet sensor 48 illustrated in FIG. 42 in the same manner as in the above embodiment makes it possible to obtain the same advantageous effects as in the above embodiment.

Figure 44:
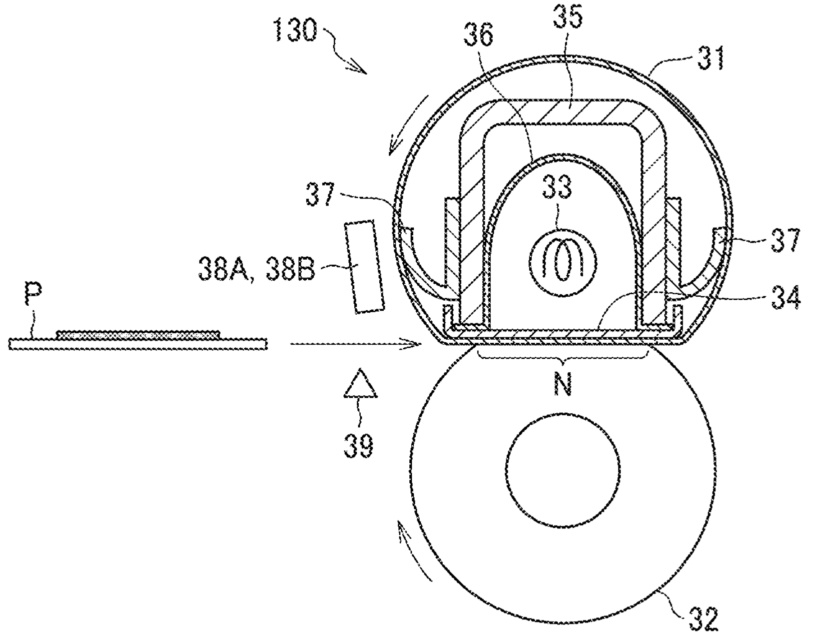
FIG. 44 is a diagram illustrating the configuration of a fixing device according to an embodiment of the present disclosure.

Furthermore, according to an embodiment of the present disclosure, a fixing device 130 has the configuration illustrated in FIG. 44.

The fixing device 130 illustrated in FIG. 44 includes a fixing belt 31, a pressure roller 32, a halogen heater 33, a nip formation pad 34, a stay 35, a reflection member 36, guides 37, a central temperature sensor 38A, an end-portion temperature sensor 38B, and a sheet sensor 39.

The nip formation pad 34 is a member that is disposed inside the fixing belt 31 to form a nip N in cooperation with the pressure roller 32. As illustrated in FIG. 44, the pressure roller 32 is pressed against the nip formation pad 34 via the fixing belt 31, whereby the nip N is formed between the pressure roller 32 and the fixing belt 31. The configurations of the pressure roller 32 and the fixing belt 31 are basically the same as those of the pressure roller 22 and the fixing belt 21 of the embodiment illustrated in FIG. 2 and the like.

The stay 35 is a supporting member that supports the nip formation pad 34. Since the nip formation pad 34 is supported by the stay 35, warping of the nip formation pad 34 due to pressurization of the pressure roller 32 is reduced, and the nip N having a uniform width is formed.

The halogen heater 33 is a heating body disposed inside the fixing belt 31, and has basically the same configuration as the halogen heater 53 illustrated in FIGS. 42 and 43. In this case, however, the radiant heat emitted from the halogen heater 33 is not directly applied to the fixing belt 31, but is applied to the nip formation pad 34, whereby the nip formation pad 34 is heated. Then, the heat of the nip formation pad 34 is transmitted to the fixing belt 31 to heat the fixing belt 31. In other words, the nip formation pad 34 forms the nip N and also functions as a heat transfer member that transfers heat to the fixing belt 31 at the nip N. To conduct heat, the nip formation pad 34 is made of metal having good thermal conductivity such as copper or aluminum.

The reflection member 36 is a member that mainly reflects radiant heat emitted from the halogen heater 33 to the nip formation pad 34. The reflection member 36 reflects the radiation heat of the halogen heater 33 to the nip formation pad 34, so that the fixing belt 31 is effectively heated via the nip formation pad 34. In addition, since the reflection member 36 is interposed between the halogen heater 33 and the stay 35, transmission of radiant heat of the halogen heater 33 to the stay 35 is reduced, and energy saving can be achieved.

The guides 37 are disposed inside the loop of the fixing belt 31 to guide the inner circumferential surface of the fixing belt 31 rotating. When the fixing belt 31 is guided by the guides 37, the fixing belt 31 smoothly rotates without large deformation.

The central temperature sensor 38A, the end-portion temperature sensor 38B, and the sheet sensor 39 basically have the same functions as those of the central temperature sensor, the end-portion temperature sensor, and the sheet sensor according to the above embodiment.

Also in the fixing device 130 having such a configuration, arranging the central temperature sensor 38A, the end-portion temperature sensor 38B, and the sheet sensor 39 in the same manner as in the above embodiment makes it possible to obtain the same advantageous effects as in the above embodiment.

In the above, various configurations of the fixing device and the image forming apparatus in which the embodiments can be applied are described. Applying the embodiments to the various configurations of the fixing device and the image forming apparatus give effects similar to the above-described effects in the embodiments. In other words, applying the above-described embodiments makes it possible to improve various disadvantages in the fixing device such as detection of a positional shift of the sheet, temperature rise in the non-sheet passing area, and temperature decrease on the end portions of the sheet-passing area while achieving the cost reduction.

In the above-described embodiments, the present disclosure is applied to the fixing device that is an example of the heating device. A heating device according to an embodiment of the present disclosure is not limited to the fixing device. A heating device according to an embodiment of the present disclosure may be, for example, a heating device such as a dryer to dry liquid such as ink applied to the sheet, a laminator that heats, under pressure, a film serving as a covering member onto the surface of the sheet such as paper, or a thermocompression device such as a heat sealer that seals a seal portion of a packaging material with heat and pressure.

To summarize the above-described aspects of the present disclosure, the present disclosure includes a heating device, a fixing device, and an image forming apparatus having at least the following aspects.

First Aspect

A first aspect is a heating device according to an embodiment of the present disclosure is a heating device including: a pair of rotators that contacts each other to form a nip through which a sheet passes; a heating source that has a heat generation area in which a resistive heat generator is arranged to heat at least one of the pair of rotators; a plurality of temperature detection members that detect a temperature of the heating source, a member in contact with the heating source, or one of the pair of rotators; and a sheet detection member that detects the sheet passing through the nip. The plurality of temperature detection members includes a first temperature detection member disposed at a position closer to one end of the heat generation area in a longitudinal direction of the heating source than a center of the heat generation area in the longitudinal direction of the heating source, and a second temperature detection member disposed at a position closer to the center of the heat generation area in the longitudinal direction of the heating source than the first temperature detection member is. The second temperature detection member is disposed at a position shifted from the center of the heat generation area toward the first temperature detection member, and the sheet detection member is disposed on a side opposite a side on which the first temperature detection member is disposed with reference to the center of the heat generation area in the longitudinal direction of the heating source.

Second Aspect

A second aspect is the heating device according to the first aspect in which the second temperature detection member and the sheet detection member are disposed within a minimum sheet-passing width in which a sheet having a minimum width passes.

Third Aspect

A third aspect is the heating device according to the first or second aspect in which a sum of a distance in the longitudinal direction between the center of the heat generation area and the second temperature detection member and a distance in the longitudinal direction between the center of the heat generation area and the sheet detection member is longer than a half of the minimum sheet passing width through which a sheet having a minimum width passes.

Fourth Aspect

A fourth configuration is the heating device according to any one of the first to third aspects in which the distance in the longitudinal direction between the center of the heat generation area and the second temperature detection member is longer than the distance in the longitudinal direction between the center of the heat generation area and the sheet detection member.

Fifth Aspect

A fifth configuration is the heating device according to any one of the first to third aspects in which a distance in the longitudinal direction between the center of the heat generation area and the second temperature detection member is shorter than a distance in the longitudinal direction between the center of the heat generation area and the sheet detection member.

Sixth Aspect

A sixth aspect is the heating device according to any one of the first to fifth aspects in which the first temperature detection member is disposed outside a maximum sheet-passing width in which a sheet having a maximum width passes.

Seventh Aspect

A seventh aspect is the heating device according to any one of the first to sixth configurations in which at least one of the pair of rotators heated by the heating source is a belt, and the belt includes a base and a surface layer disposed on an outer peripheral side of the base, with no elastic layer between the surface layer and the base.

Eighth Aspect

An eighth aspect is a fixing device that fixes an unfixed image to a sheet using the heating device according to any one of the first to seventh aspects.

Ninth Aspect

A ninth aspect is an image forming apparatus including the heating device according to any one of the first to seventh aspects or the fixing device according to the eighth aspect.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A heating device, comprising:

a pair of rotators configured to contact each other to form a nip through which a sheet passes;

a heating source having a heat generation area, the heating source including a resistive heat generator configured to heat at least one of the pair of rotators;

a plurality of temperature sensors configured to detect a temperature of the heating source, a member in contact with the heating source, or one of the pair of rotators; and a single sheet sensor configured to detect the sheet passing through the nip, the plurality of temperature sensors including:

a first temperature sensor at a position closer to one end of the heat generation area in a longitudinal direction of the heating source than a center of the heat generation area in the longitudinal direction of the heating source; and a second temperature sensor at a position closer to the center of the heat generation area in the longitudinal direction of the heating source than the first temperature sensor is, the second temperature sensor at a position shifted from the center of the heat generation area toward the first temperature sensor in the longitudinal direction of the heating source, and the sheet sensor on a side opposite a side on which the first temperature sensor is located with reference to the center of the heat generation area in the longitudinal direction of the heating source, and the first temperature sensor is outside a maximum sheet-passing width in which a sheet having a maximum width passes.

2. The heating device according to claim 1, wherein the second temperature sensor and the sheet sensor are within a minimum sheet-passing width in which a sheet having a minimum width passes.

3. The heating device according to claim 1, wherein a sum of a distance in the longitudinal direction between the center of the heat generation area and the second temperature sensor and a distance in the longitudinal direction between the center of the heat generation area and the sheet sensor is longer than one half of a minimum sheet-passing width through which a sheet having a minimum width passes.

4. The heating device according to claim 1, wherein a distance in the longitudinal direction between the center of the heat generation area and the second temperature sensor is longer than a distance in the longitudinal direction between the center of the heat generation area and the sheet sensor.

5. The heating device according to claim 1, wherein a distance in the longitudinal direction between the center of the heat generation area and the second temperature sensor is shorter than a distance in the longitudinal direction between the center of the heat generation area and the sheet sensor.

6. The heating device according to claim 1, wherein the at least one of the pair of rotators heated by the heating source is a belt; and the belt includes a base and a surface layer on an outer peripheral side of the base, the belt not having any elastic layer between the surface layer and the base.

7. A fixing device, comprising:

a heating device configured to fix an unfixed image on a sheet, the heating device including, a pair of rotators configured to contact each other to form a nip through which the sheet passes;

a heating source having a heat generation area, the heating source including a resistive heat generator configured to heat at least one of the pair of rotators;

a plurality of temperature sensors configured to detect a temperature of the heating source, a member in contact with the heating source, or one of the pair of rotators; and a single sheet sensor configured to detect the sheet passing through the nip, the plurality of temperature sensors including:

a first temperature sensor at a position closer to one end of the heat generation area in a longitudinal direction of the heating source than a center of the heat generation area in the longitudinal direction of the heating source; and a second temperature sensor at a position closer to the center of the heat generation area in the longitudinal direction of the heating source than the first temperature sensor is, the second temperature sensor at a position shifted from the center of the heat generation area toward the first temperature sensor in the longitudinal direction of the heating source, and the sheet sensor on a side opposite a side on which the first temperature sensor is located with reference to the center of the heat generation area in the longitudinal direction of the heating source, and the first temperature sensor is outside a maximum sheet-passing width in which a sheet having a maximum width passes.

8. An image forming apparatus comprising:

at least one image forming device configured to form at least one image on at least one sheet;

a pair of rotators configured to contact each other to form a nip through which the sheet passes;

a heating source having a heat generation area, the heating source including a resistive heat generator configured to heat at least one of the pair of rotators;

a plurality of temperature sensors configured to detect a temperature of the heating source, a member in contact with the heating source, or one of the pair of rotators; and a single sheet sensor configured to detect the sheet passing through the nip, the plurality of temperature sensors including:

a first temperature sensor at a position closer to one end of the heat generation area in a longitudinal direction of the heating source than a center of the heat generation area in the longitudinal direction of the heating source; and a second temperature sensor at a position closer to the center of the heat generation area in the longitudinal direction of the heating source than the first temperature sensor is, the second temperature sensor at a position shifted from the center of the heat generation area toward the first temperature sensor in the longitudinal direction of the heating source, and the sheet sensor on a side opposite a side on which the first temperature sensor is located with reference to the center of the heat generation area in the longitudinal direction of the heating source, and the first temperature sensor is outside a maximum sheet-passing width in which a sheet having a maximum width passes.

9. The heating device according to claim 1, further comprising:

a controller configured to control the heating source based on the detected temperature of the heating source detected by at least one of the first temperature sensor and the second temperature sensor.

10. The heating device according to claim 9, wherein the controller is further configured to:

reduce a printing speed of the sheet passing through the nip based on a difference between the temperature of the heating source detected by the first temperature sensor and the temperature of the heating source detected by the second temperature sensor.

11. The heating device according to claim 9, wherein the controller is further configured to:

stop the sheet from passing through the nip based on a difference between the temperature of the heating source detected by the first temperature sensor and the temperature of the heating source detected by the second temperature sensor.

12. The heating device according to claim 9, wherein the controller is further configured to:

detect erroneous loading of the sheet based on detection results of the sheet sensor and a difference between the temperature of the heating source detected by the first temperature sensor and the temperature of the heating source detected by the second temperature sensor.

13. The heating device according to claim 9, wherein the controller is further configured to:

detect a positional shift of the sheet passing through the nip based on detection results of the sheet sensor and a difference between the temperature of the heating source detected by the first temperature sensor and the temperature of the heating source detected by the second temperature sensor.

14. The image forming apparatus according to claim 8, wherein the second temperature sensor and the sheet sensor are within a minimum sheet-passing width in which a sheet having a minimum width passes.

15. The image forming apparatus according to claim 8, wherein a sum of a distance in the longitudinal direction between the center of the heat generation area and the second temperature sensor and a distance in the longitudinal direction between the center of the heat generation area and the sheet sensor is longer than one half of a minimum sheet-passing width through which a sheet having a minimum width passes.

16. The image forming apparatus according to claim 8, wherein a distance in the longitudinal direction between the center of the heat generation area and the second temperature sensor is longer than a distance in the longitudinal direction between the center of the heat generation area and the sheet sensor.

17. The image forming apparatus according to claim 8, wherein a distance in the longitudinal direction between the center of the heat generation area and the second temperature sensor is shorter than a distance in the longitudinal direction between the center of the heat generation area and the sheet sensor.

18. The image forming apparatus according to claim 8, further comprising:

a controller configured to control the heating source based on the detected temperature of the heating source detected by at least one of the first temperature sensor and the second temperature sensor.

19. The image forming apparatus according to claim 18, wherein the controller is further configured to:

detect erroneous loading of the sheet based on detection results of the sheet sensor and a difference between the temperature of the heating source detected by the first temperature sensor and the temperature of the heating source detected by the second temperature sensor.

20. The image forming apparatus according to claim 18, wherein the controller is further configured to:

detect a positional shift of the sheet passing through the nip based on detection results of the sheet sensor and a difference between the temperature of the heating source detected by the first temperature sensor and the temperature of the heating source detected by the second temperature sensor.

* * * * *